(12) United States Patent
Perz et al.

(10) Patent No.: US 8,369,591 B2
(45) Date of Patent: Feb. 5, 2013

(54) SILHOUETTE IMAGE ACQUISITION

(75) Inventors: Cynthia B. Perz, Huntington Beach, CA (US); Jose De La Torre-Bueno, Encinitas, CA (US); Robert T. Ellis, Dana Point, CA (US); Gina Marie McLaren, Laguna Niguel, CA (US); Mary Jean Smith, Solana Beach, CA (US)

(73) Assignee: Carl Zeiss Microimaging GmbH, Jena (DE)

( * ) Notice: Subject to any disclaimer, the term of this patent is extended or adjusted under 35 U.S.C. 154(b) by 234 days.

(21) Appl. No.: 12/587,107

(22) Filed: Oct. 1, 2009

(65) Prior Publication Data

US 2010/0141682 A1    Jun. 10, 2010

Related U.S. Application Data

(63) Continuation of application No. 10/413,493, filed on Apr. 11, 2003, now abandoned.

(51) Int. Cl.
*G06K 9/00* (2006.01)

(52) U.S. Cl. ........................ 382/128; 382/100

(58) Field of Classification Search .............. 382/128, 382/100
See application file for complete search history.

(56) References Cited

U.S. PATENT DOCUMENTS

| | | | |
|---|---|---|---|
| 3,809,478 A | 5/1974 | Talbot | |
| 3,824,393 A | 7/1974 | Brain | |
| 3,851,972 A | 12/1974 | Smith et al. | |
| 4,011,004 A | 3/1977 | Levine et al. | |
| 4,037,965 A | 7/1977 | Weiss | |
| 4,097,845 A | 6/1978 | Bacus | |
| 4,125,828 A | 11/1978 | Resnick et al. | |
| 4,196,265 A | 4/1980 | Koprowski et al. | |
| 4,207,554 A | 6/1980 | Resnick et al. | |
| 4,210,419 A | 7/1980 | Castleman | |
| 4,249,825 A | 2/1981 | Shapiro | |
| 4,338,024 A | 7/1982 | Bolz et al. | |
| 4,393,466 A | 7/1983 | Deindoerfer et al. | |
| 4,404,683 A | 9/1983 | Kobayashi et al. | |
| 4,453,266 A | 6/1984 | Bacus | |
| 4,513,438 A | 4/1985 | Graham et al. | |
| 4,538,299 A | 8/1985 | DeForest | |

(Continued)

FOREIGN PATENT DOCUMENTS

| | | | |
|---|---|---|---|
| DE | 3340647 A1 | 5/1985 | |
| DE | 3735091 A1 | 4/1988 | |

(Continued)

OTHER PUBLICATIONS

PAIR File History for U.S. Appl. No. 10/413,493, filed Apr. 11, 2003.

(Continued)

*Primary Examiner* — Hadi Akhavannik
(74) *Attorney, Agent, or Firm* — Patterson Thuente Christensen Pedersen PA

(57) ABSTRACT

Systems and techniques to acquire image data. In general, in one implementation, the technique includes: acquiring image data for a plurality of areas of a scan region. The technique may further include processing the image data to determine whether an area includes one or more desired features. The technique may further include designating an area as "interesting" if it includes a desired feature, and designating an area as non-interesting if it does not include the desired feature. The areas may be sub-divided one or more times, and subdivisions may be analyzed to determine if they include a desired feature.

12 Claims, 14 Drawing Sheets

U.S. PATENT DOCUMENTS

| | | | |
|---|---|---|---|
| 4,549,204 | A | 10/1985 | Bertero et al. |
| 4,612,614 | A | 9/1986 | Deindoerfer et al. |
| 4,631,581 | A | 12/1986 | Carlsson |
| 4,656,594 | A | 4/1987 | Ledley |
| 4,673,973 | A | 6/1987 | Ledley |
| 4,700,298 | A | 10/1987 | Palcic et al. |
| 4,734,578 | A | 3/1988 | Horikawa |
| 4,741,043 | A | 4/1988 | Bacus |
| 4,745,270 | A | 5/1988 | Horikawa et al. |
| 4,771,469 | A | 9/1988 | Wittenburg |
| 4,800,269 | A | 1/1989 | Horikawa |
| 4,845,552 | A | 7/1989 | Jaggi et al. |
| 4,873,440 | A | 10/1989 | Mori et al. |
| 4,893,008 | A | 1/1990 | Horikawa |
| 4,945,220 | A | 7/1990 | Mallory et al. |
| 4,953,979 | A | 9/1990 | Hirako |
| 4,965,725 | A | 10/1990 | Rutenberg |
| 4,991,223 | A | 2/1991 | Bradley |
| 5,003,165 | A | 3/1991 | Sarfati et al. |
| 5,008,185 | A | 4/1991 | Bacus |
| 5,014,198 | A | 5/1991 | Umemura et al. |
| 5,016,173 | A | 5/1991 | Kenet et al. |
| 5,018,209 | A | 5/1991 | Bacus |
| 5,042,950 | A | 8/1991 | Salmon, Jr. |
| 5,065,447 | A | 11/1991 | Barnsley et al. |
| 5,068,909 | A | 11/1991 | Rutherford et al. |
| 5,085,325 | A | 2/1992 | Jones et al. |
| 5,086,222 | A | 2/1992 | Shibuya |
| 5,087,965 | A | 2/1992 | Torre-Bueno |
| 5,099,521 | A | 3/1992 | Kosaka |
| 5,121,436 | A | 6/1992 | Kasdan et al. |
| 5,123,055 | A | 6/1992 | Kasdan |
| RE34,214 | E | 4/1993 | Carlsson |
| 5,202,931 | A | 4/1993 | Bacus |
| 5,231,580 | A | 7/1993 | Cheung et al. |
| 5,233,684 | A | 8/1993 | Ulichney |
| 5,254,845 | A | 10/1993 | Burgess et al. |
| 5,257,182 | A | 10/1993 | Luck et al. |
| 5,268,966 | A | 12/1993 | Kasdan |
| 5,287,272 | A | 2/1994 | Rutenberg et al. |
| 5,309,221 | A | 5/1994 | Fischer et al. |
| 5,313,532 | A | 5/1994 | Harvey et al. |
| 5,317,140 | A | 5/1994 | Dunthorn |
| 5,321,545 | A | 6/1994 | Bisconte |
| 5,333,207 | A | 7/1994 | Rutenberg |
| 5,338,924 | A | 8/1994 | Barrett et al. |
| 5,352,613 | A | 10/1994 | Tafas et al. |
| 5,375,177 | A | 12/1994 | Vaidanathan et al. |
| 5,409,007 | A | 4/1995 | Saunders et al. |
| 5,428,447 | A | 6/1995 | Toida |
| 5,428,690 | A | 6/1995 | Bacus et al. |
| 5,432,871 | A | 7/1995 | Novik |
| 5,449,622 | A | 9/1995 | Yabe et al. |
| 5,459,384 | A | 10/1995 | Engelse et al. |
| 5,463,470 | A | 10/1995 | Terashita et al. |
| 5,469,353 | A | 11/1995 | Pinsky et al. |
| 5,473,706 | A | 12/1995 | Bacus et al. |
| 5,481,401 | A | 1/1996 | Kita et al. |
| 5,499,097 | A | 3/1996 | Ortyn et al. |
| 5,515,172 | A | 5/1996 | Shiau |
| 5,521,984 | A * | 5/1996 | Denenberg et al. ............ 382/209 |
| 5,526,258 | A | 6/1996 | Bacus |
| 5,533,628 | A | 7/1996 | Tao |
| 5,555,889 | A | 9/1996 | Karagueuzian et al. |
| 5,583,666 | A | 12/1996 | Ellson et al. |
| 5,585,469 | A | 12/1996 | Kojima et al. |
| 5,602,941 | A | 2/1997 | Charles et al. |
| 5,619,032 | A | 4/1997 | Kasdan |
| 5,621,532 | A | 4/1997 | Ooki et al. |
| 5,625,705 | A | 4/1997 | Recht |
| 5,625,709 | A | 4/1997 | Kasdan |
| 5,627,907 | A | 5/1997 | Gur et al. |
| 5,635,402 | A | 6/1997 | Alfano et al. |
| 5,646,677 | A | 7/1997 | Reber |
| 5,647,025 | A | 7/1997 | Frost et al. |
| 5,671,288 | A | 9/1997 | Wilhelm et al. |
| 5,690,892 | A | 11/1997 | Babler et al. |
| 5,691,779 | A | 11/1997 | Yamashita et al. |
| 5,701,172 | A | 12/1997 | Azzazy |
| 5,706,093 | A | 1/1998 | Komiya |
| 5,726,009 | A | 3/1998 | Connors et al. |
| 5,740,267 | A | 4/1998 | Echerer et al. |
| 5,740,270 | A | 4/1998 | Rutenberg et al. |
| 5,783,814 | A | 7/1998 | Fairley et al. |
| 5,799,105 | A | 8/1998 | Tao |
| 5,846,749 | A | 12/1998 | Slamon et al. |
| 5,848,177 | A | 12/1998 | Bauer et al. |
| 5,854,851 | A | 12/1998 | Bamberger et al. |
| 5,867,598 | A | 2/1999 | de Queiroz |
| 5,877,161 | A | 3/1999 | Riabowol |
| 5,880,473 | A | 3/1999 | Ginestet |
| 5,888,742 | A | 3/1999 | Lal et al. |
| 5,889,881 | A | 3/1999 | MacAulay et al. |
| 5,911,003 | A | 6/1999 | Sones |
| 5,911,327 | A | 6/1999 | Tanaka et al. |
| 5,966,309 | A | 10/1999 | O'Bryan et al. |
| 5,966,465 | A | 10/1999 | Keith et al. |
| 6,005,964 | A | 12/1999 | Reid et al. |
| 6,006,191 | A | 12/1999 | DiRienzo |
| 6,007,996 | A | 12/1999 | McNamara et al. |
| 6,011,595 | A | 1/2000 | Henderson et al. |
| 6,031,929 | A | 2/2000 | Maitz et al. |
| 6,040,139 | A | 3/2000 | Bova |
| 6,058,322 | A | 5/2000 | Nishikawa et al. |
| 6,072,570 | A | 6/2000 | Chipman et al. |
| 6,101,265 | A | 8/2000 | Bacus et al. |
| 6,117,985 | A | 9/2000 | Thomas et al. |
| 6,122,400 | A | 9/2000 | Reitmeier |
| 6,125,194 | A | 9/2000 | Yeh et al. |
| 6,141,602 | A | 10/2000 | Igarashi et al. |
| 6,151,405 | A | 11/2000 | Douglass et al. |
| 6,151,535 | A | 11/2000 | Ehlers |
| 6,169,816 | B1 | 1/2001 | Ravkin |
| 6,215,892 | B1 | 4/2001 | Douglass et al. |
| 6,215,894 | B1 | 4/2001 | Zeleny et al. |
| 6,225,636 | B1 | 5/2001 | Ginestet |
| 6,226,392 | B1 | 5/2001 | Bacus et al. |
| 6,236,031 | B1 | 5/2001 | Ueda |
| 6,238,892 | B1 | 5/2001 | Mercken et al. |
| 6,259,807 | B1 | 7/2001 | Ravkin |
| 6,259,826 | B1 | 7/2001 | Pollard et al. |
| 6,272,235 | B1 | 8/2001 | Bacus et al. |
| 6,275,777 | B1 | 8/2001 | Shimizu |
| 6,281,874 | B1 | 8/2001 | Sivan et al. |
| 6,290,907 | B1 | 9/2001 | Takahashi et al. |
| 6,313,452 | B1 | 11/2001 | Paragano et al. |
| 6,330,349 | B1 | 12/2001 | Hays et al. |
| 6,374,989 | B1 | 4/2002 | Van Dyke, Jr. et al. |
| 6,404,906 | B2 | 6/2002 | Bacus et al. |
| 6,404,916 | B1 | 6/2002 | De La Torre-Bueno |
| 6,415,058 | B2 | 7/2002 | Grohs et al. |
| 6,418,236 | B1 | 7/2002 | Ellis et al. |
| 6,445,817 | B1 | 9/2002 | De la Torre-Bueno |
| 6,466,690 | B2 | 10/2002 | Bacus et al. |
| 6,514,722 | B2 | 2/2003 | Palsson et al. |
| 6,518,554 | B1 | 2/2003 | Zhang |
| 6,546,123 | B1 | 4/2003 | McLaren et al. |
| 6,553,135 | B1 | 4/2003 | Douglass et al. |
| 6,631,203 | B2 | 10/2003 | Ellis et al. |
| 6,671,393 | B2 | 12/2003 | Hays et al. |
| 6,674,896 | B1 | 1/2004 | Torre-Bueno |
| 6,697,509 | B2 | 2/2004 | De La Torre-Bueno |
| 6,718,053 | B1 | 4/2004 | Ellis et al. |
| 2002/0067409 | A1 | 6/2002 | Harair et al. |
| 2002/0164810 | A1 | 11/2002 | Dukor et al. |
| 2003/0018818 | A1* | 1/2003 | Boliek et al. .................. 709/247 |
| 2003/0124589 | A1 | 7/2003 | Piper |
| 2003/0170703 | A1 | 9/2003 | Piper et al. |
| 2004/0202357 | A1* | 10/2004 | Perz et al. ..................... 382/128 |
| 2006/0039593 | A1* | 2/2006 | Sammak et al. ............... 382/133 |

FOREIGN PATENT DOCUMENTS

| | | |
|---|---|---|
| EP | 0213666 A1 | 3/1987 |
| EP | 0557871 A2 | 9/1993 |
| EP | 0713086 A1 | 5/1996 |
| GB | 2093586 A | 9/1982 |
| GB | 2173666 A | 4/1985 |

| | | |
|---|---|---|
| JP | 3021913 A | 1/1991 |
| WO | WO92/17848 | 10/1992 |
| WO | WO93/16442 | 8/1993 |
| WO | WO97/20198 | 6/1997 |
| WO | WO00/49391 | 8/2000 |
| WO | WO01/37206 A1 | 5/2001 |
| WO | WO03/014795 A1 | 2/2003 |

OTHER PUBLICATIONS

Bacus et al., "The Evaluation of Estrogen Receptor in Primary Breast Carcinoma by Computer-Assisted Image Analysis", A.J.C.P., Sep. 1988.

Esteban et al., "Quantification of Estrogen Receptors on Paraffin-Embedded Tumors by Image Analysis", Modern Pathology, vol. 4, No. 1, pp. 53, 1991.

McClelland et al., "A Multicentre Study into the Reliability of Steroid Receptor Immunocytochemical Assay Quantification" Eur J Cancer, vol. 27, No. 6, pp. 711-715, 1991.

Drobnjak et al., Immunocytochemical, Detection of Estrogen and Progesterone Receptors (ER/PR) in Paraffin Sections of Human Breast Carcinoma, Correlation with Biochemical Analysis and Automated Imaging Quantitation, Journal of The Academy of Pathology, vol. 64, No. 1, Jan. 1991.

Bander, N.H., "Monoclonal antibodies to renal cancer antigens", vol. 18, Supp. 2, pp. 10-12, 1990 Abstract.

Duda, R.O. et al., "Pattern Classification and Scene Analysis", *J. Wiley & Sons, Inc.* pp. 228-239 and 276-284 (1973).

McKeough et al., "A Low-Cost Automatic Translation and Autofocusing System for a Microscope", Measurement Science and Technology, IOP Publishing, Bristol, GB, vol. 6, No. 5, pp. 583-587, May 1, 1995.

Roca et al., "New Autofocusing Algorithm for Cytological Tissue in a Microscopy Environment", Optical Engineering, Soc. Of Photo-Optical Instrumentation Engineers, Bellingham, US, vol. 37, No. 2, pp. 635-641, Feb. 1, 1998.

Press, Michael F. et al., "Her-2/*nue* Expression in Node-negative Breast Cancer: Direct Tissue Quantitation by Computerized Image Analysis and Association of Overexpression with Increased Risk of Recurrent Disease", Cancer Research 53, 4960-4970, Oct. 1993.

Diamond, David A. et al., "Computerized Image Analysis of Nuclear Shape as a Prognostic Factor for Prostatic Cancer", The Prostate 3:321-332 (1982).

Levine, Gary M. et al., "Quantitative Immunocytochemistry by Digital Image Analysis: Application to Toxicologic Pathology", XICOLOGIC Pathology ISSN:0192-6233, vol. 15, No. 3, pp. 303-307, 1987.

Enestrom, Sverker et al., "Quantitative Ultrastructural Immunocytochemistry Using a Computerized Image Analysis System", Stain Technology, vol. 65, No. 6, pp. 263-278, 1990.

Mize, R. Ranney et al., "Quantitative immunocytochemistry using an image analyzer. I. Hardware evaluation, image processing, and data analysis", Journal of Neuroscience Methods, 26 (1988) 1-24.

Caulet S. et al., "Comparative Quantitative Study of Ki-67 Antibody Staining in 78 B and T Cell Malignant Lymphoma (ML) Using Two Image Analyser Systems", Path. Res. Pract. 188, 490-496 (1992).

Goldschmidt, R.A. et al., "Automated Immunohistochemical Estrogen Receptor Staining and Computerized Image Analysis-Comparison with Biochemical Methods", Supplied by the British Library— "The world's knowledge" www.bl.uk.

Gross, Douglas S. et al., "Quantitative Immunocytochemistry of Hypothalamic and Pituitary Hormones: Validation of an Automated, Computerized Image Analysis System", The Journal of Histochemistry and Cytochemistry, vol. 33, No. 1, pp. 11-20, 1985.

Maudelonde, T. et al., "Immunostaining of Cathepsin D in Breast Cancer: Quantification by Computerised Image Analysis and Correlation with Cytosolic Assay", Eur T Cancer, vol. 28A, No. 10, pp. 1686-1691, 1992.

Aziz, Douglas C., "Quantitation of Estrogen and Progesterone Receptors by Immunocytochemical and Image Analyses", Anatomic Pathology, From Cytometrics, Inc., Division of Specialty Laboratories, pp. 105-111, Jul. 1991.

Unnerstall, James R. et al., "New Approaches to Quantitative Neuropathology: Multtivariate Analysis of Morphologic and Neurochemical Measures", Neurobiology of Aging, vol. 8, pp. 567-569, Pergamon Journals Ltd., 1987.

Horsfall, D.J. et al., "Immunocytochemical assay for oestrogen receptor in fine needle aspirates of breast cancer by video image analysis", Br. J. Cancer (1989), 59, 129-134.

McClelland, Richard A. et al., "Automated Quantitation of Immunocytochemically Localized Estrogen Receptors in Human Breast Cancer", Cancer Research 50, 3545-3550, Jun. 1990.

Baddoura, Fady K. et al., "Image Analysis for Quantitation of Estrogen Receptor in Formalin-Fixed Paraffin-Embedded Sections of Breast Carcinoma", Modern Pathology, vol. 4, No. 1, 1991, pp. 91-95.

Kerns, B.J. et al., "Estrogen receptor status evaluated in formalin-fixed paraffin embedded breast carcinomas determined by automated immunohistochemistry and image analysis", Proceedings of the American Association for Cancer Research, vol. 35, Mar. 1994.

Ballard, et al., *Computer Vision*, Chapter 3, "Early Processing", pp. 65-70; Chapter 5, pp. 149-165, Prentice Hall, Inc., Englewood Cliffs, New Jersey, 182.

Huffmann, "A Method for the Construction of Minimum-Redundancy Codes", *Proceedings of the I.R.E.*, pp. 1098-1101, Sep. 1952.

Russ, John C., " Image Processing Handbook, $2^{nd}$ Edition", Library of Congress Cataloging-in-Publication Data, 1995.

ChromaVision, "Products", http://www/chromavision.com/products/index.htm.

Pratt, William K., "Digital Image Processing, $2^{nd}$ Edition," A Wiley-Interscience Publication, 1991.

PCT Written Opinion and International Search Report cited in PCT/US04/11334 mailed Nov. 22, 2009.

\* cited by examiner

SILHOUETTE IMAGE ACQUISITION

RELATED APPLICATION

This application is a continuation of Application Ser. No. 10/413,493 filed Apr. 11, 2003, which is hereby fully incorporated herein by reference.

BACKGROUND OF THE INVENTION

Obtaining and analyzing images of materials plays an important role in many areas of technology. For example, the ability to obtain and analyze accurate images efficiently is important in the field of anatomic pathology. Anatomic pathology enables the diagnosis of physiological conditions such as cancer, infectious disease and prenatal disorders through analysis of tissue samples.

Typically, a biological specimen from a patient is obtained, imaged, and analyzed. The specimen may be "stained" using a material chosen to reveal the presence of one or more molecules. The specimen may then be placed on a slide for viewing with a microscope.

An image of the sample may be obtained using a digital camera. In some systems, the sample may be scanned, and a series of images may be obtained. The image data may then be analyzed. For example, an image may be analyzed to identify the presence of particular characteristic features of a particular disease, where the particular characteristic features indicate the presence of or predisposition towards the disease.

FIELD OF THE INVENTION

The present application describes systems and techniques relating to image data acquisition.

SUMMARY OF THE INVENTION

Systems and techniques described herein may enable efficient and accurate image acquisition and processing.

In general, in one aspect, a method includes obtaining an image of at least a portion of a scan region, and analyzing the image to determine if the image includes a first desired feature. If the image includes the first desired feature, the method may include electronically dividing the image into a plurality of subimages at the same magnification and determining the presence or absence of a second desired feature in each subimage. The first desired feature and the second desired feature may be the same or different. For example, the first desired feature may be the presence of at least a portion of a sample in the scan region. The method may include analyzing images and/or subimages to determine the presence or absence of other features besides the first and second desired features.

The image may be acquired at a first magnification, which may comprise a field of view smaller than the scan region. The plurality of subimages may each comprise an area that is substantially equal to the field of view of a higher magnification. The method may further include acquiring an image of an area of the scan region including the second desired feature at higher magnification. For example, one or more higher magnification images may be obtained, so that each subimage including the second desired feature is imaged at the higher magnification.

The scan region may be a microscope slide or a portion of a microscope slide. The microscope slide may have a sample thereon, or may have more than one sample (e.g., a tissue array). The sample may be a biological sample.

The method may include storing an identifier for the image, as well as data associated with the identifier, where the data indicates the presence or absence of the first desired feature. The method may include storing an identifier for the subimages, as well as data associated with the identifier, where the data indicates the presence or absence of the second desired feature.

In general, in one aspect, a system includes an image acquisition system, which may include a camera and/or microscope. A data processor may be coupled with the image acquisition system. The data processor may receive image data from the image acquisition system, and may determine the presence or absence of a desired feature in the image. If the data processor determines the presence of the desired feature, the data processor may electronically divide the image data into a plurality of subimage portions. The data processor may determine the presence or absence of the desired feature, another feature, or both in the plurality of subimage portions.

In general, in another aspect, a method may include obtaining a first focal length at a first position comprising a sample, obtaining a second focal length at a second position comprising a sample furthest from the first position, and obtaining a third focal length at a third position comprising a sample at a position furthest from the first and second positions. The method may include generating a focal plane comprising the focal length of the first, second, and third positions.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION OF THE DRAWINGS

The systems and techniques described herein relate to image acquisition. For example, the systems and techniques provide for efficient and accurate imaging and analysis of materials such as biological samples.

The challenges of obtaining and processing images are interconnected. In order to accurately determine the characteristics of a sample, at least a portion of the sample may need to be viewed or analyzed at high resolution. However, high resolution images are generally very large data files. If the entire sample were to be imaged and image data stored at high resolution, the data storage and analysis challenge may be greater than the ability of an available data processing system. For example, a digital representation of an entire microscope slide obtained using a high power lens may include 100 to 400 separate images. Obtaining, storing, and analyzing such a large number of digital images may be prohibitive in many applications.

A number of approaches may be used to meet these challenges. In some systems, a user views a low resolution image of, for example, a microscope slide. The user then defines an area of interest on the slide (e.g., the outline of a tissue sample) to be imaged at higher resolution. Thus, a high resolution image of the entire slide is not necessary. However, these systems require substantial user involvement and may also require that the user be trained to recognize areas of interest.

Other approaches include using data compression methods to reduce the size of the stored image files and to ease the task of analysis. However, the data compression methods used may decrease the accuracy of the data and, although they may reduce the size of the data files appreciably, may not do so adequately while retaining the desired image quality.

Figure 1:
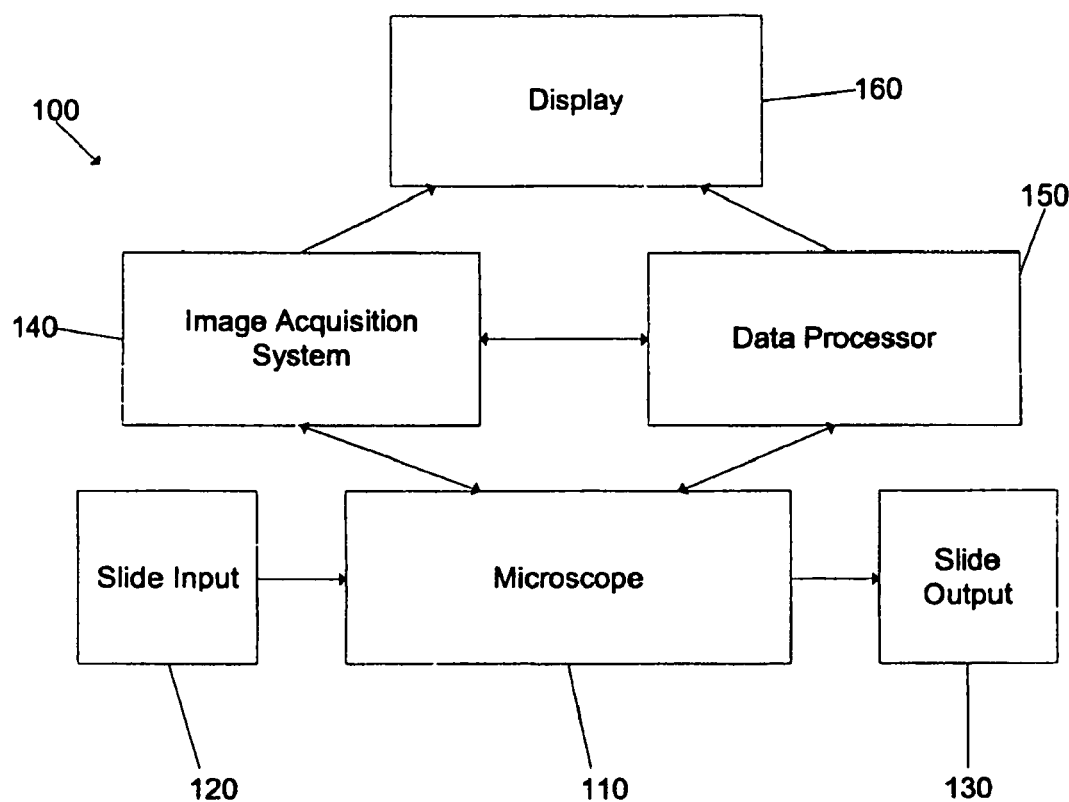
FIG. 1 shows a block diagram of a system that may be used to acquire image data.

FIG. 1 shows a system 100 that may be used to acquire image data, according to various implementations. A microscope 110, such as an optical microscope, receives a sample holder with a scan region, where the scan regions includes a sample to be imaged. For example, a slide input 120 may provide one or more microscope slides including (for example) a tissue sample to microscope 110. Microscope 110 may also be coupled with a slide output 130 to receive slides that have been processed.

An image acquisition system 140, which includes a digital camera or other image data acquisition element, is coupled with microscope 110. Microscope 110 and image acquisition system 140 may be coupled with one or more data processing systems such as a data processor 150. A display 160 may be coupled with data processor 150 and/or image acquisition system 140, for providing a visual display of an image and/or image data. Note that the elements of FIG. 1 are shown separately; however, some or all of them may be integrated. For example, slide input 120 and slide output 130 may be integrated with microscope 110 rather than separate.

Figure 2:
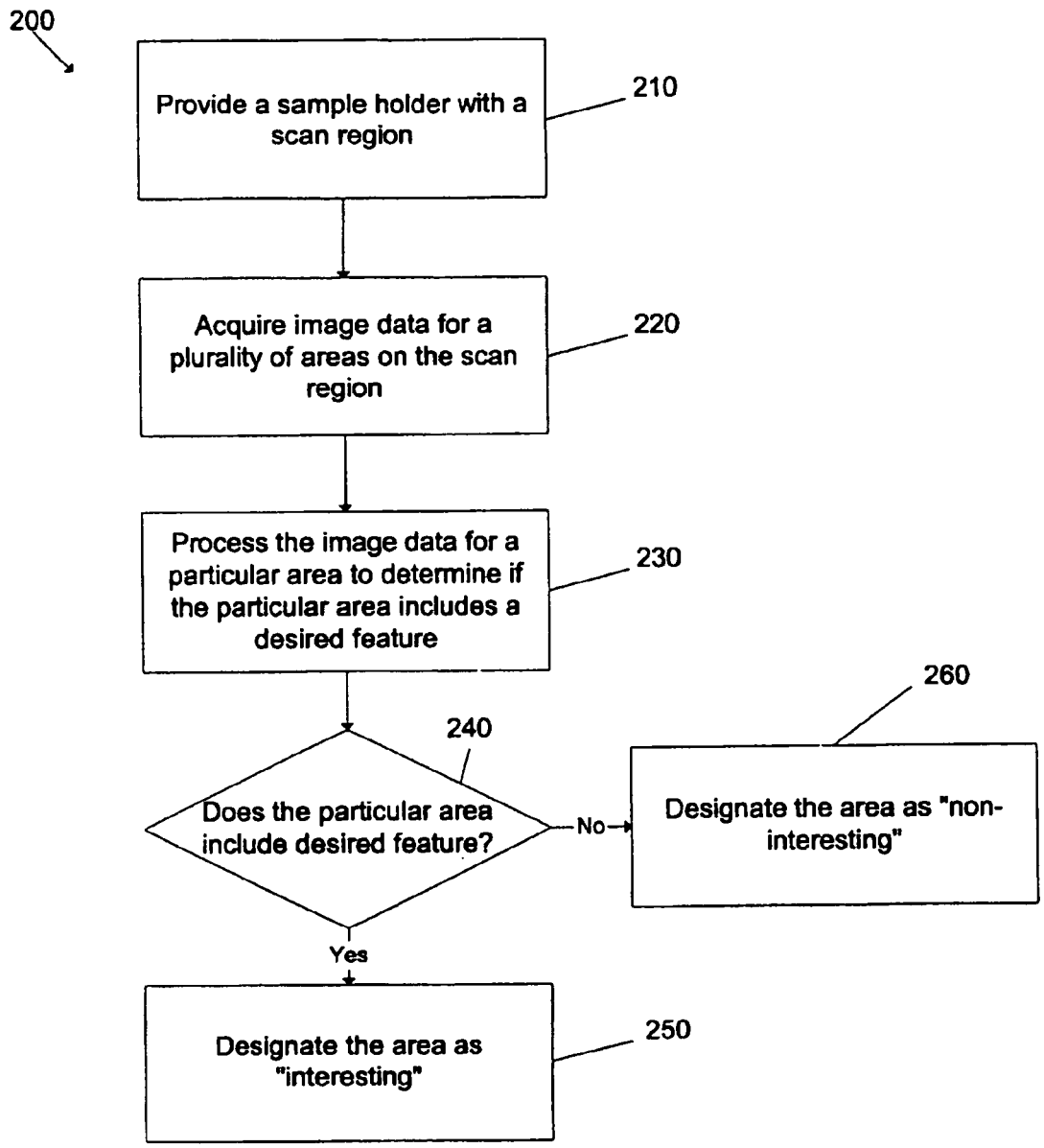
FIG. 2 is a flowchart showing a process for acquiring and analyzing image data for a plurality of areas.

FIG. 2 shows a method 200 for acquiring image data using a system such as system 100 of FIG. 1. A sample holder with a scan region is provided to a microscope (210). For example, the sample holder may be a microscope slide, while the scan region may be an area of the microscope slide in which a sample (e.g., a tissue specimen) may be found. In another example, the sample holder may be a microscope slide, while the scan region may include an array of specimens (such as an array of tissue samples).

Image data for a plurality of areas in the scan region may be acquired (220). Image data for a particular area may be processed to determine if the particular area includes a desired feature (230, 240). If the particular area includes a desired feature, the area is designated as "interesting" (250). If the particular area does not include a desired feature, the area is designated as "non-interesting" (260). The coordinates (e.g., x-y coordinates) of "interesting" areas may be stored for later review and/or processing. Method 200 may include processing the image data for each of the plurality of imaged areas, and designating each of the areas as either interesting or non-interesting.

The plurality of areas may form an array covering the scan region. A first silhouette including the interesting areas of the array may be formed. The first silhouette forms a low-resolution image of the sample in the scan region. For example, when the sample holder is a microscope slide with a specimen on the scan region of the slide, the scan region may be divided into an array of areas, and each area that includes at least a portion of the specimen will be deemed "interesting" and thus included in the first silhouette.

Data associated with the first silhouette may be stored in a memory such as a memory included in data processor 150. For example, the memory may store a table including an identifier for each location, where each interesting location is designated as a logical 1, and each non-interesting location is designated as a logical 0.

The system may scan all the areas; for example, by scanning across each of the rows or columns of the array in turn. In some implementations, the system may scan fewer than all areas. For example, if the specimen is a contiguous tissue sample on a slide, the system may find a portion of the boundary of the tissue sample, and may use this information to scan only some of the areas.

Figure 3:
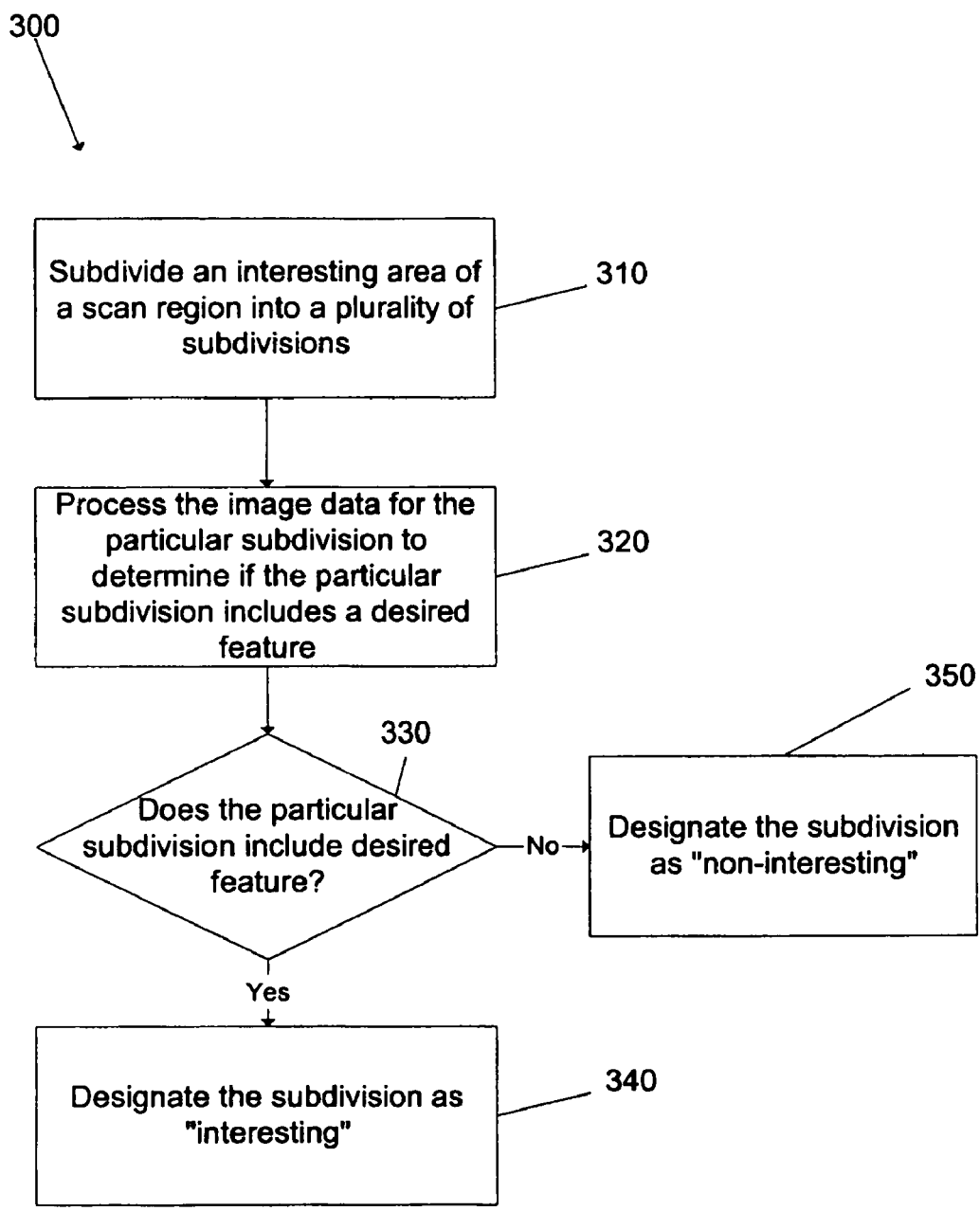
FIG. 3 is a flowchart showing a process of acquiring and analyzing image data for a plurality of subdivisions.

In some implementations, the areas in the first silhouette may be imaged at higher resolution to obtain desired information about the sample in the scan region. That is, the interesting regions (those that include the desired feature) may be imaged using a higher magnification setting of a microscope, and the subsequent image data may be compressed and stored. However, this may be inefficient (since the interesting areas may include only a small portion of the sample) and may require significant data storage and data analysis. Therefore, in other implementations, the interesting areas of the scan region may be sub-divided and the system may determine which subdivisions include one or more desired features. FIG. 3 shows a method 300 that may be used to subdivide the areas of the scan region.

An interesting area, identified at block 250, may be subdivided into a plurality of subdivisions (310). The image data (e.g., a portion of the image data acquired in block 220) for the particular subdivision may then be processed to determine if the particular subdivision includes a desired feature (320, 330). If the particular subdivision includes the desired feature, it may be designated as "interesting" (340). If the particular subdivision does not include the desired feature, it may be designated as "non-interesting" (350). The coordinates of "interesting" subdivisions can be stored for later review and/or processing at a higher magnification. In one aspect, a subdivision (also termed "minor-zelle") area is approximately equal to the field of view of a higher power objective of a microscope. In some implementations, each of the subdivisions may be analyzed; in others, less than all subdivisions are analyzed.

Method 300 may be used to form a second silhouette of higher resolution than the first silhouette. That is, the second silhouette more clearly defines the region in which the sample is located (or in which a different desired feature is present). As with the first silhouette, in some implementations, the interesting subdivisions in the second silhouette may be imaged at higher magnification to obtain desired information about the sample in the scan region. In some implementations, additional subdivisions may be desired, where each subdivision step generates a higher resolution silhouette than the previous step.

Figure 4:
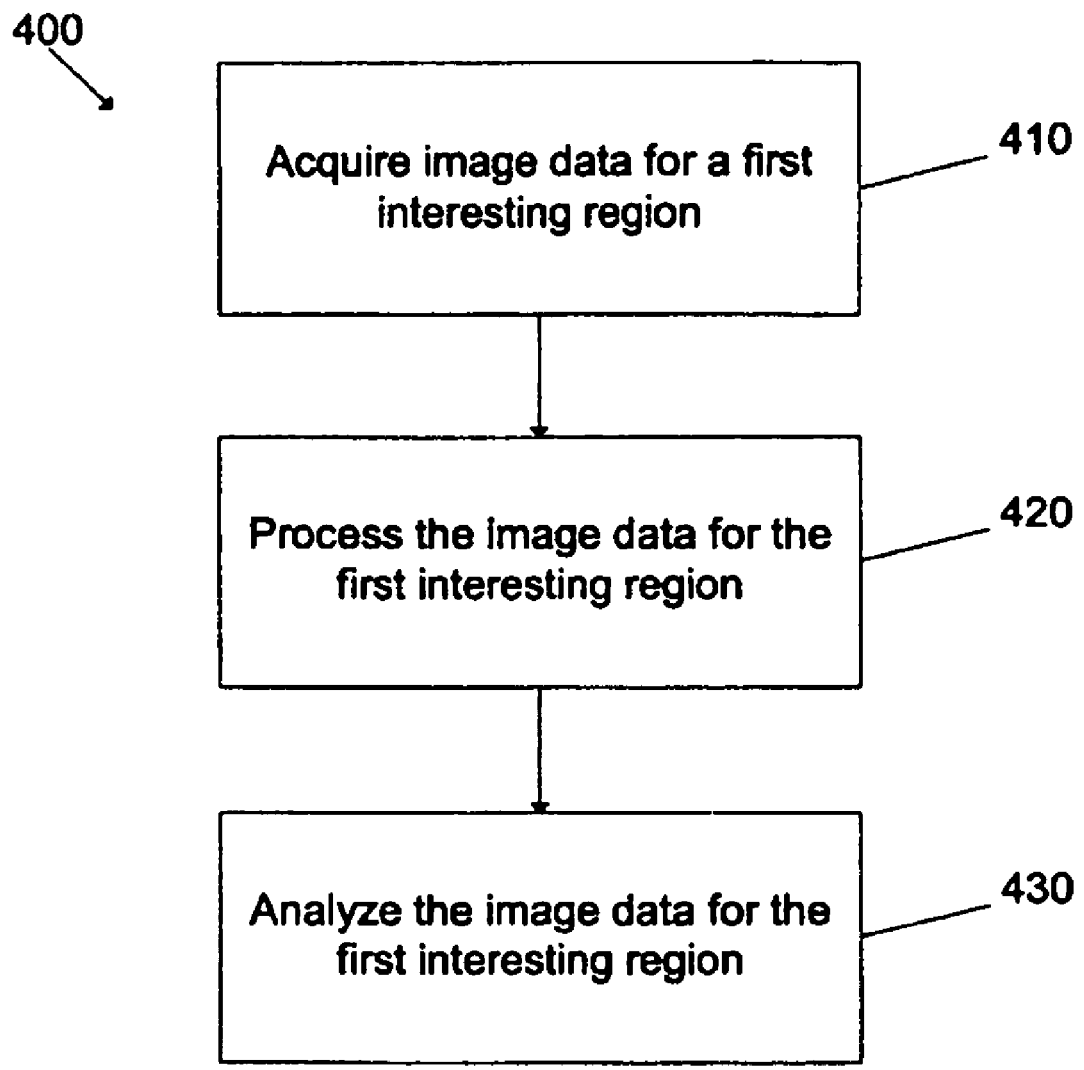
FIG. 4 is a flowchart showing a process of acquiring and analyzing image data for a region designated as interesting.

FIG. 4 shows a method 400 that may be used to image a silhouette, where the areas, subdivisions, etc. of the silhouette are referred to generally as regions. That is, if the silhouette is a first silhouette, the regions correspond to the areas discussed above, if the silhouette is a second silhouette, the regions correspond to the sub-divisions discussed above, if the silhouette is a third silhouette, the regions correspond to sub-sub-divisions, and so on.

An image of a first region is acquired (410). The image may be processed using one or more image processing algorithms (420). The image may also be analyzed using one or more image analysis algorithms (430). In some implementations, method 400 is repeated for all interesting regions in the silhouette. In others, fewer than all interesting regions may be imaged. For example, if a tissue sample is being analyzed to determine the presence of a particular feature such as the presence of a marker for a particular disease, method 400 may be repeated until the presence of the feature is detected or until all of the regions of the silhouette have been imaged.

FIGS. 5-12 below show exemplary systems and techniques that may be used in some implementations. For explanatory purposes, FIGS. 5-12 describe image acquisition and processing in terms of four phases (a FIND phase, a FOCUS phase, a SCAN phase, and a COLLECT phase). Further information may be found in a number of references, such as U.S. Pat. Nos. 6,546,123; 6,518,554; 6,445,817; 6,418,236; 6,404,916; 6,330,349; 6,215,892; and 6,151,405, which are incorporated by reference.

Figure 5A:
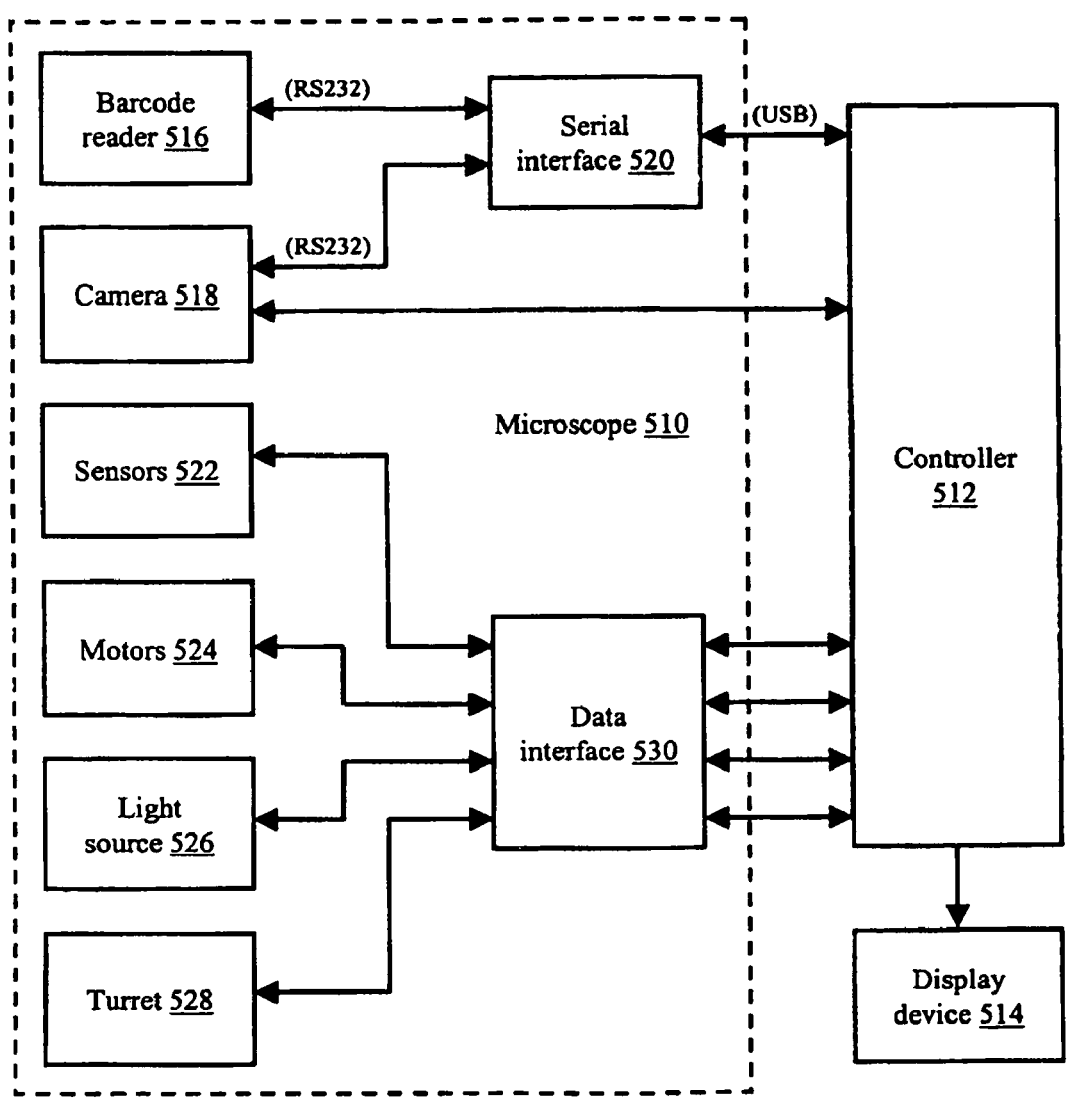
FIGS. 5A and 5B show a system that may be used to acquire image data.
Figure 5B:
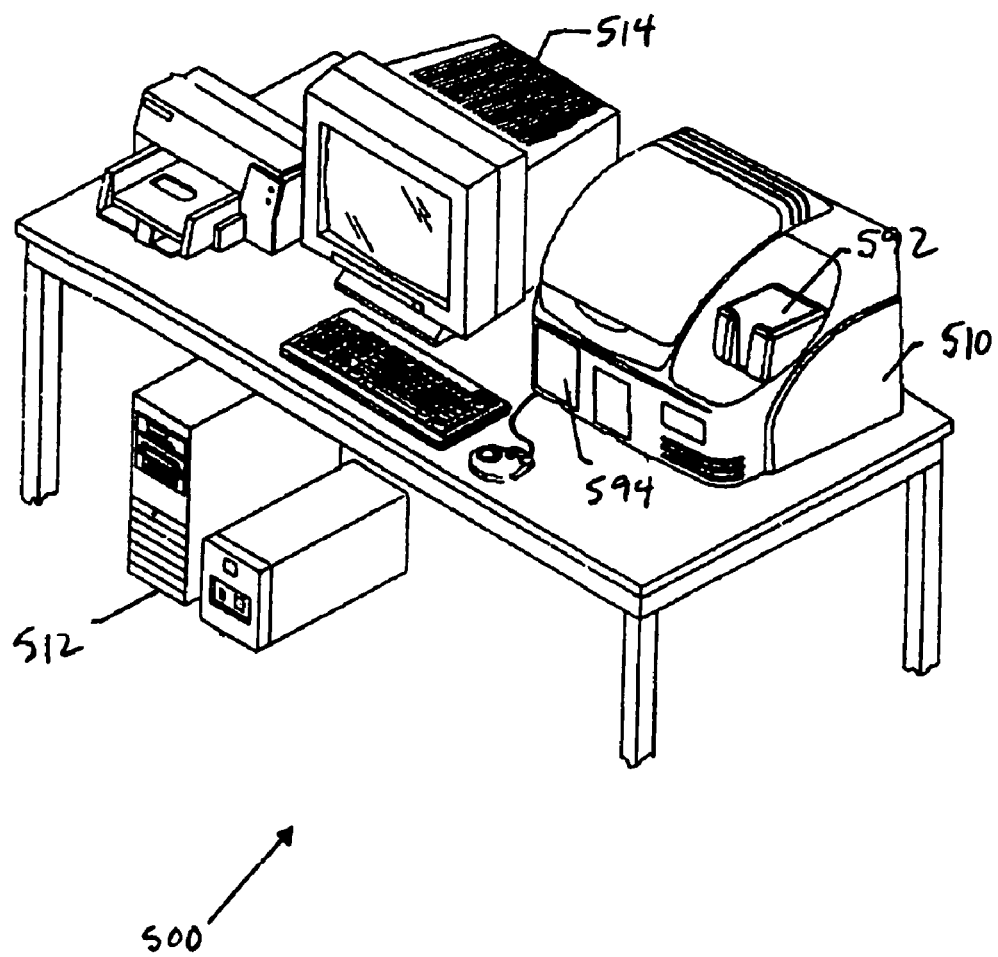

FIGS. 5A and 5B show a system 500 for image acquisition and processing. System 500 includes a microscope subsystem 510, which is coupled with a controller 512 and a display device 514. System 500 may include, for example, a Chromavision ACIS™ system or other appropriate system. Controller 512 may be included in a computer such as a desktop, laptop, or host computer, or may be implemented differently (e.g., as a unit integrated with microscope subsystem 510). Controller 512 may control system 500 using, for example, image processing algorithms and image analysis algorithms.

Microscope subsystem 510 includes a barcode reader 516, a camera 518, a serial interface 520, one or more sensors 522, one or more motors 524, a light source 526, a turret 528, and a data interface 530. Barcode reader 516 may be a standard barcode reader to detect a barcode identifier for the sample. In some implementations, a sample barcode may be positioned on a sample slide in an area separate from a scan region. Camera 518 may be a digital camera with selectable resolution capabilities. For example, camera 518 may be a charge-coupled device (CCD) camera. Camera 518 may be mounted on a turret 528 of microscope subsystem 510, such that its aperture is aligned with the field of view (FOV) of a lens associated with turret 528. An interface such as serial interface 520 may facilitate communication among barcode reader 516, camera 518, and controller 512.

In an implementation, interface 520 is a serial interface providing a USB coupling between controller 512 and camera 518. Camera 518 may provide a direct video output connect to a video card within control 512 that gathers the image data from camera 518 for processing.

Sensors 522 may include, for example, position sensors, temperature sensors, light intensity sensors, optical encoders, or other sensors. Motors 524 may be servomotors, and may provide motion control of microscope subsystem 510. For example, motors 524 may be used to rotate an appropriate lens within the optical path of the microscope, may be used to adjust focus (e.g., by changing a distance between a sample surface and optical elements), may be used to move an automated X-Y stage (not shown), or may provide different or additional functionality in system 500.

Light source 526 may be any suitable light source for appropriately illuminating the FOV of an objective of the microscope such that the creation of a digital image of that FOV is possible. Turret 528 may be a motor-driven microscope turret upon which is mounted a set of lenses of varying power that may be rotated into the optical path of the microscope. Turret 528 may also be suitably controlled to provide a desired focus.

Sensors 522, motors 524, light source 526, and turret 528 may feed electrical inputs of data interface 530. Data interface 530 may be a system driver card to facilitate a data communication link between sensors 522, motors 524, light source 526, turret 528, and a motion control card within controller 512.

System 500 may operate as follows. A microscope slide (referred to as a "target slide") may be fed into an automated X-Y stage of microscope subsystem 510 via an in-feed stage 592, and subsequently positioned in the FOV of the microscope. During the transition from the in-feed stage of system 500 to the X-Y stage of microscope subsystem 510, the identifier of the target microscope slide may be read by barcode reader 516.

The target slide may then be scanned at various resolutions and magnifications based upon image-processing algorithms and image analysis algorithms executed by controller 512. For example, the techniques described below may be used to acquire image data at various magnifications of the microscope.

After the image scan operation, the slide may be transferred out of system 500 via an out-feed stage 594. The slide identifier and image data may be transmitted to controller 512 to be stored in one or more memories. The motion control system may then move another slide into the FOV of the microscope.

The process may automatically repeat for each slide that is provided to system 500. In an implementation, the imaging process is initiated when one or more slides are provided to the in-feed stage and continues without user intervention until no more slides are available at the in-feed stage, and as long as no system errors occur. However, a user (e.g., a clinician) may view and/or manipulate the digital image of one or more slides via controller 512 and display device 514 for the inspection and analysis of a sample.

Figure 6A:
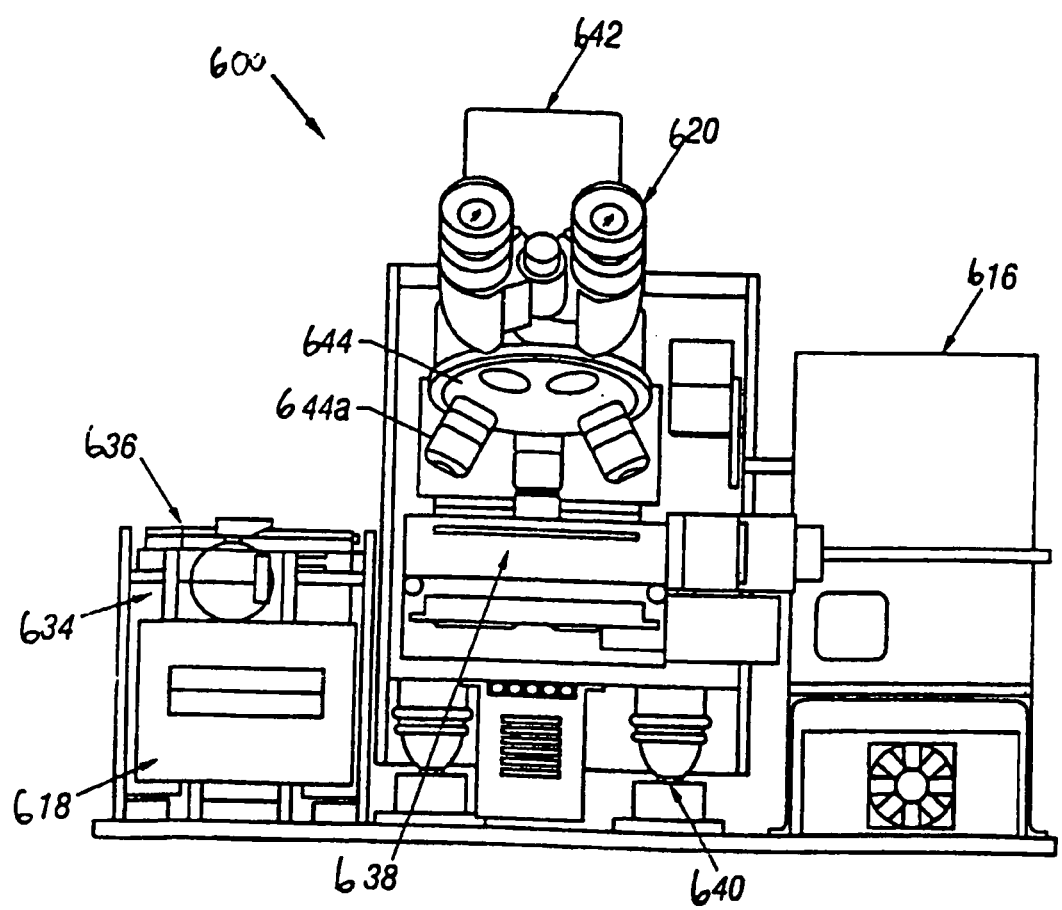
FIGS. 6A and 6B show a microscope subsystem for acquiring image data.
Figure 6B:
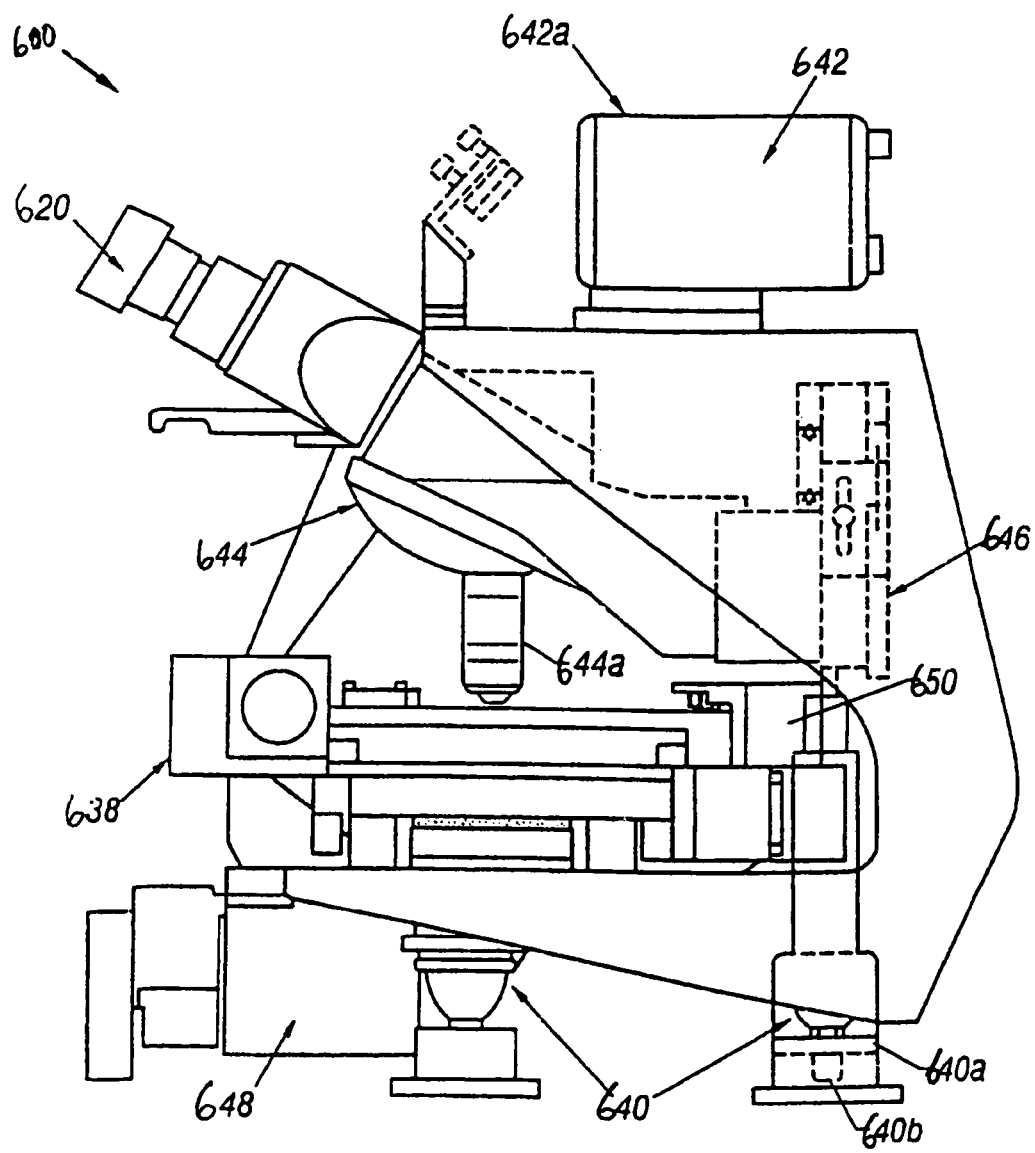

FIGS. 6A and 6B show a microscope subsystem 600 that may be used in some implementations. A similar microscope subsystem and method of operation is more fully described in pending U.S. Patent Application Ser. No. 60/450,824, filed Feb. 27, 2003, which is hereby incorporated by reference.

FIG. 6A shows a plan view of a microscope subsystem 600. Shown is slide carrier unloading assembly 634 and unloading platform 636 which in conjunction with slide carrier output hopper 618 function to receive slide carriers which have been analyzed. Vibration isolation mounts 640, shown in further detail in FIG. 6B, are provided to isolate the microscope subsystem 600 from mechanical shock and vibration that can occur in a typical laboratory environment. In addition to external sources of vibration, the high-speed operation of the X-Y stage 638 can induce vibration into the microscope subsystem 600. Such sources of vibration can be isolated from the electro-optical subsystems to avoid any undesirable effects on image quality. The isolation mounts 640 comprise a spring 640a and piston 640b (see FIG. 6B) submerged in a high viscosity silicon gel which is enclosed in an elastomer membrane bonded to a casing to achieve damping factors on the order of about 17 to 20%. Other dampening devices are known in the art and may be substituted or combined with the dampening device provided herein. Oculars 620 are shown in FIGS. 6A and 6B, however, their presence is an optional feature. The oculars 620 may be absent without departing from the advantages or functionality of the system.

Figure 7:
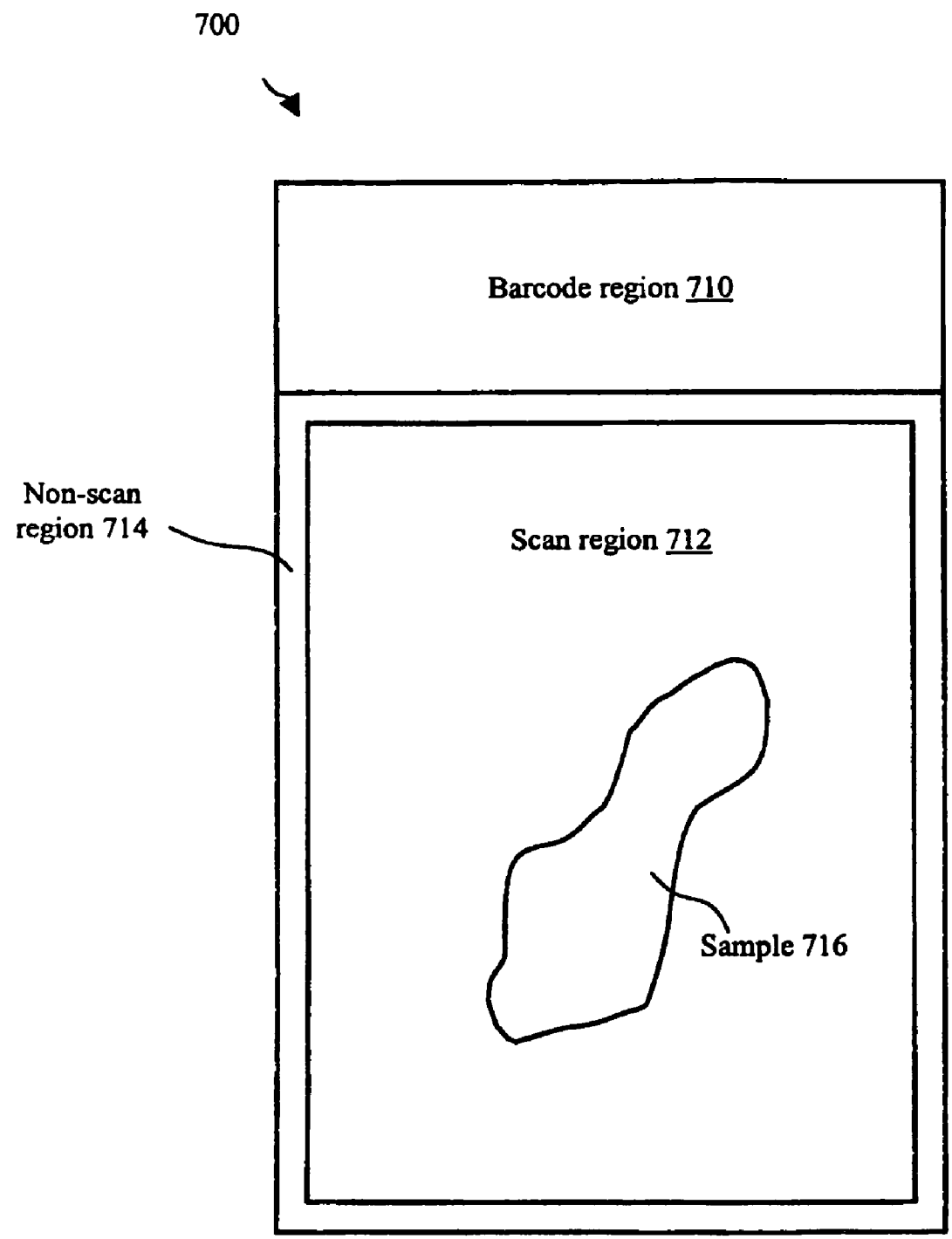
FIG. 7 shows a slide including a scan region.

FIG. 7 shows a slide 700 (e.g., a conventional glass microscope slide), which may be used some implementations. Oriented at one end of slide 700 is a barcode region 710 including an identifier such as a barcode sticker. Slide 700 further includes a scan region 712 surrounded by a non-scan region 714, where scan region 712 includes a sample 716 to be imaged. Sample 716 may be any target specimen, such as a tissue sample resulting from a needle biopsy. Non-scan region 714 may include an area along the edge of slide 700.

Figure 8:
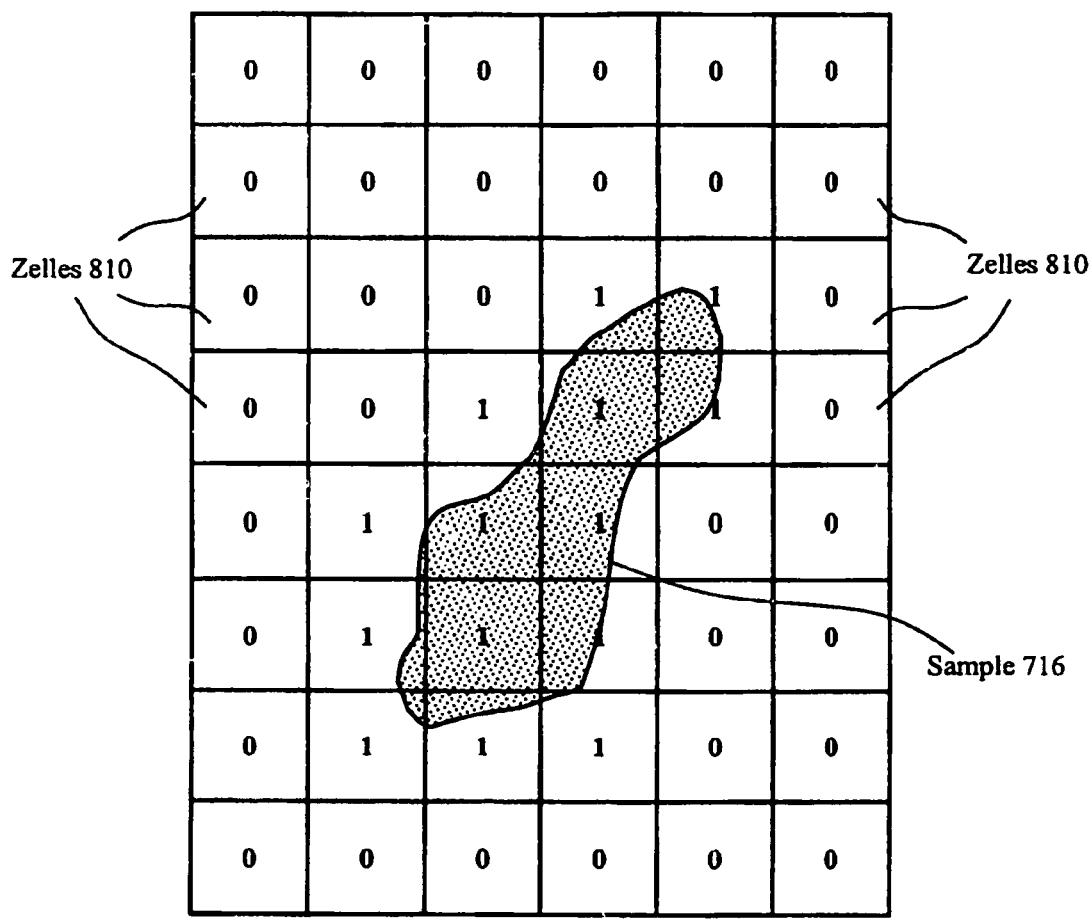
FIG. 8 shows an expanded view of a scan region.

FIG. 8 shows an expanded view of a scan region such as region 712 of slide 700. During a FIND phase, scan region 712 is partitioned into an array of contiguous segments, referred to as zelles 810. Note that this is not generally a physical partition, but rather a logical segmentation of scan region 712 to be used for imaging scan region 712. The area of the zelles 810 may be determined by the power (i.e., magnification) setting of the microscope. For example, as the magnification is increased, the FOV of the microscope decreases, so that each zelle 810 is smaller for greater magnifications.

In some implementations, zelles 810 may be defined so that there is some overlap. If there is no overlap in the zelles 810, inaccuracies in the X-Y stage of the microscope may cause some region of the sample to be missed in the imaging. Overlap of images may not be necessary where the digital spacing between pixels is finer than the optical resolution of an objective lens of the microscope and/or wherein the movement of the X-Y stage has an error of movement less than the optical resolution of the objective lens (see, e.g., U.S. Pat. No. 6,272,235, which is incorporated herein by reference). Although this may be acceptable for some implementations, it may not in others. For example, when the desired sample feature is small, the missed region may lead to undesirable inaccuracy in imaging results.

During the FIND phase, zelles 810 may be determined by the FOV of the microscope at generally low magnification and resolution. Therefore, the FIND phase results in a relatively small scan time and amount of stored image data. Further, since low-power lenses have a greater depth of focus than higher-power lenses, re-focusing may be unnecessary. For example, a low-power lens of the microscope of FIG. 5 may be focused at either a best-guess plane or a plane derived from microscope calibration during the FIND phase of operation. Optionally, a separate low-resolution, wide FOV camera may be used during the FIND phase of operation.

During the FIND phase, image processing algorithms and image analysis algorithms may be executed by controller 512 to determine any regions of slide 700 having content worthwhile for reexamination at a higher magnification during a subsequent COLLECT phase of operation.

More specifically, a zelle 810 found to have specimen content is classified as "interesting" and may be mapped as a logical "1." By contrast, any zelle 810 found to have no specimen content is classified as "non-interesting" and may be mapped as a logical "0." In this manner, a silhouette of the specimen (i.e. sample 716) is formed. The "interesting" zelles thus form a low-resolution image that may be processed using image processing algorithms. An image table may be generated that represents the low-resolution image of sample 716 that results from the FIND phase of operation.

Parameters applicable to the particular sample being imaged are provided. The parameters are then used to determine whether a particular zelle 810 is interesting or non-interesting. For example, in a particular sample, a zelle may be interesting if it includes blue stain, red stain, any speck of tissue, a plurality of tissues in a micro-tissue array, or a large volume of tissue. Therefore, one or more parameters that indicate the presence of blue stain, red stain, any speck of tissue, a plurality of tissues in a micro-tissue array, or a large volume of tissue may be provided to analyze the image.

A statistical algorithm may be used to determine whether a particular zelle 810 is interesting or non-interesting. That is, an image of each zelle 810 is obtained and analyzed using a statistical algorithm to determine if the zelle 810 includes one or more of the applicable parameters. Using the statistical algorithm, zelles 810 that include even a small segment of interest may be identified. At the same time, substantial analysis of empty zelles 810 is avoided.

Figure 9:
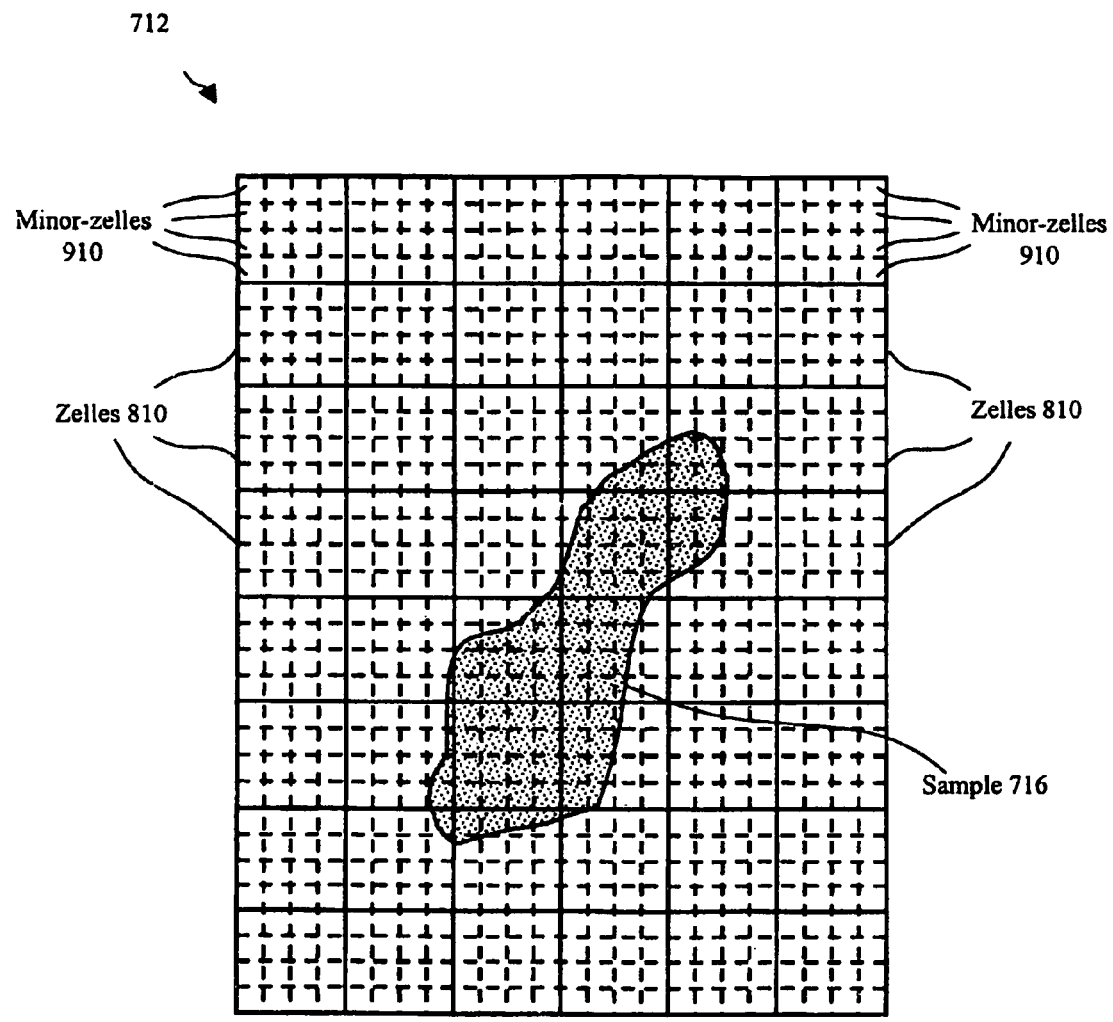
FIG. 9 shows another expanded view of a scan region.

FIG. 9 shows another expanded view of scan region 712 of slide 700. In order to obtain better information about the location of sample 716 in scan region 712, one or more zelles 810 may be partitioned into a plurality of minor-zelles 910. Minor zelles 910 may allow sample 716 or one or more features of sample 716 to be more precisely located in scan region 712. Referring again to FIG. 8, some zelles 810 include a large amount of sample 716, while others include only a small amount. By defining minor-zelles 910, areas of zelles 810 not including sample 716 may be identified and disregarded in subsequent actions.

The minor-zelles 910 may be imaged, and image processing and image analysis algorithms may be used to designate particular minor-zelles 910 as "interesting" or "non-interesting." Interesting minor-zelles 910 may be mapped as a logical "1," while non-interesting minor-zelles 910 may be mapped as a logical "0." One or more image tables may be generated, including information as to whether minor-zelles 910 are uninteresting or interesting. Note that the same and/or different parameters may be used to determine whether a particular minor-zelle is interesting or non-interesting. The image data associated with "non-interesting" regions may be discarded, thereby decreasing the storage space requirements. Image-processing and/or image analysis algorithms may be used. For example, algorithms may be used to determine whether microscope slide 700 contains a valid sample 716 or whether sample 716 meets distribution expectations.

Figure 10:
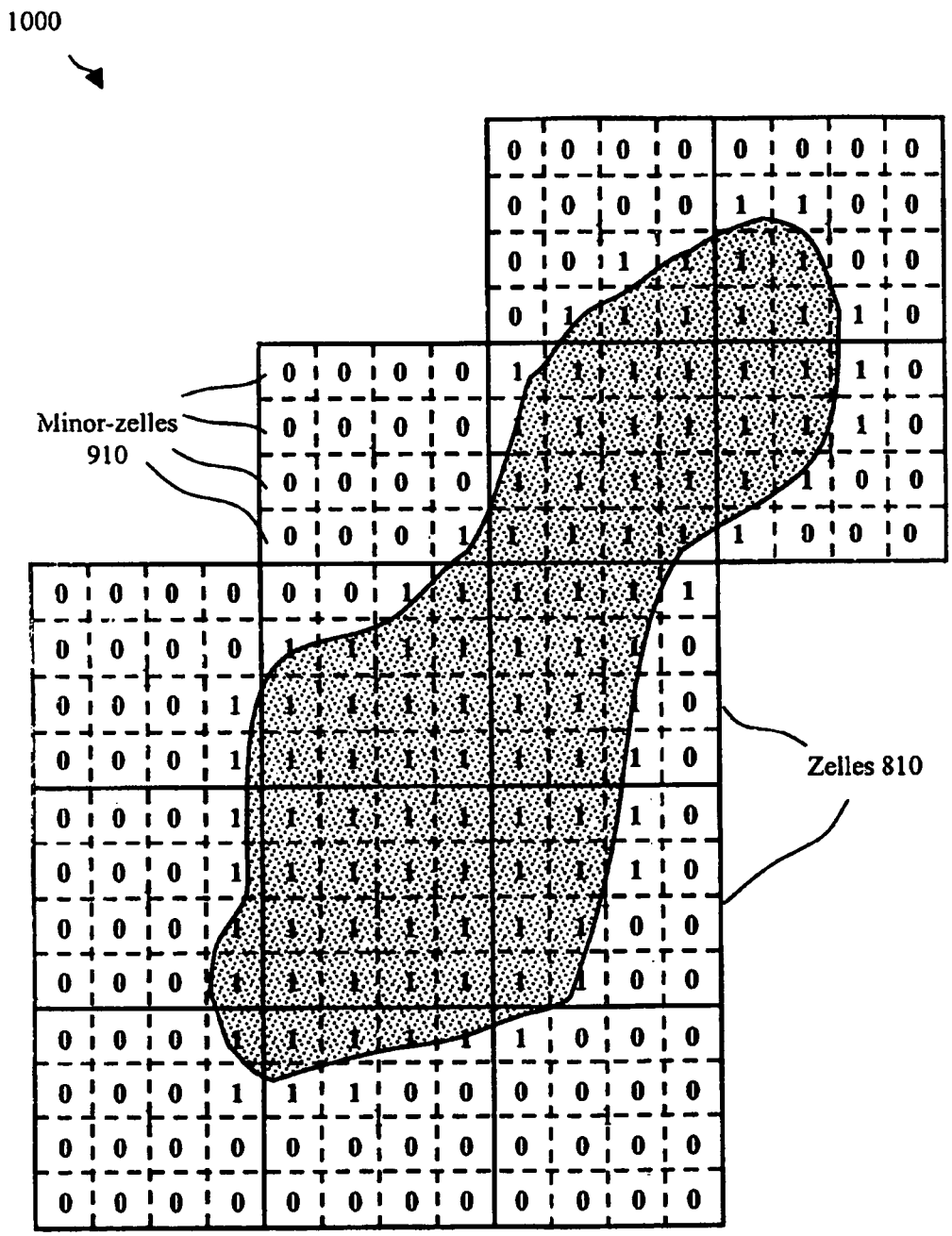
FIG. 10 shows a FIND silhouette.

FIG. 10 shows a FIND silhouette 1000, which is mapping of minor-zelles 910 designated as either a logical 1 or 0 for those zelles 810 designated as a logical 1. The mapping forms a higher resolution silhouette of sample 716.

Figure 11:
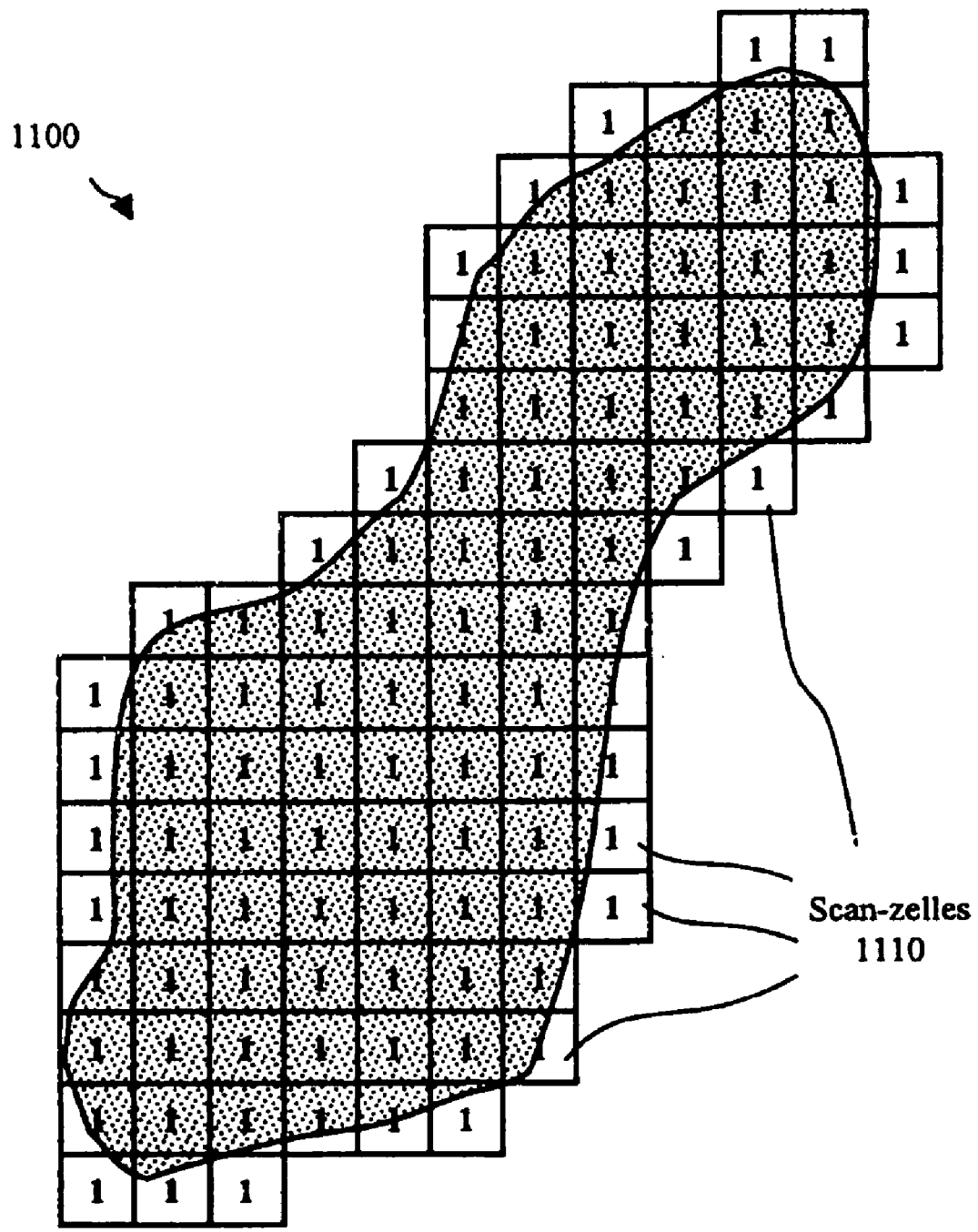
FIG. 11 shows a SCAN silhouette.

FIG. 11 shows a SCAN silhouette 1100 of scan-zelles 1110. SCAN silhouette 1100 is a "content-is-interesting" silhouette that is captured and analyzed in the SCAN phase of operation. FIG. 11 illustrates that the level of "interesting" regions is more finely defined by SCAN silhouette 1100 than by FIND silhouette 1000.

As a result of the SCAN phase, further image data associated with "non-interesting" regions may be discarded, thus further optimizing image data storage upon controller 512. In general, SCAN silhouette 1100 of sample 716 can still be thought of as a very coarse demagnified image, in which each scan-zelle 1110 can be thought of as a pixel with a 0 or 1 value. An image table may be generated that represents the image of sample 716 that results from the SCAN phase of operation. Subsequently, standard image-processing operations such as erosion, dilation, and hole filling or more complex algorithms such as image segmentation algorithms may be performed.

Additionally, criteria other than "interesting" or "non-interesting" may be used to analyze image data. For example, in the FOCUS phase of operation, knowing the status of each scan-zelle 1110 provides microscope imaging system 500 with knowledge of where to focus, e.g., microscope imaging system 500 can focus on regions known to have tissue. This is required when using a high-power lens with a lesser depth of focus in the SCAN or COLLECT phase of operation as compared with a low-power lens used in the FIND phase of operation. Ideally, in the FOCUS phase of operation it is desirable to know of specific features to focus on, as focus algorithms tend to run better on specific features, such as an edge. Having classified scan-zelles 1110 as "interesting" or "non-interesting" provides microscope imaging system 500 with the knowledge of what focus algorithm to use. An image analysis algorithm can be run to further classify scan-zelles 1110 not only as "interesting," but also as may designate a scan-zelle 1110 as a good candidate to focus on. Again, an image table may be generated as to whether a specific scan-zelle 1110 is a good candidate to focus upon.

In general, various sequences of operations may occur to modify the "interesting" regions as determined by the requirements of a particular test. The result is a table of "interesting" and "non-interesting" scan-zelles 1110 as modified via the specific requirements. Subsequently, the sequence of image shots for the SCAN or COLLECT phase of operation is planned and these "interesting" regions are selected for focusing upon; thus, planning can occur for the focus algorithms that are run in the FOCUS phase of operation.

There are several different ways to determine the placement of focus points during the FOCUS phase of operation. For example, a first scan-zelle 1110 classified as "interesting for focus point" may be selected as a first focus point. A database including information about scan-zelles 1110 may then be searched for a second "interesting for focus point" scan-zelle 1110 of the same classification that is most distant from the first "interesting for focus point" scan-zelle 1110. This second scan-zelle 1110 may then be selected as a second focus point. Similarly, the database may then be searched for a third "interesting for focus point" scan-zelle 1110 of same classification that includes the greatest area between the third and the previous two. This third scan-zelle 1110 may be selected as a third focus point. The three focus points thus define a focus plane. In this implementation, a classification of "interesting for focus points" is used rather than the classification of "interesting." This may be beneficial in some circumstances, since some scan-zelles 1110 classified as only "interesting" may have gotten that classification from the dilate operation and actually may contain no tissue, and thus may be less desirable candidates for focus points than scan-zelles 1110 containing tissue.

Using a table of "interesting for focus points" scan-zelles 1110, algorithms for selecting focus points may be executed. The number of focus points is either one of the parameters of the application or can be derived from the tissue sample size and/or the distribution of sample pieces. Thus, the desired number of focus points is found accordingly during the FOCUS phase of operation, along with some extra focus points in case some are later found to be unusable. In this way, a FOCUS phase of operation occurs using focus algorithms (a parameter might be set as to which focus algorithm to use). The goal is to achieve at least a minimum number of focus points that meet the predetermined criteria, from which a focus plane is constructed. It may be inefficient to stop and focus each image; instead it may be more efficient to compute the Z-axis, drive the microscope lens to that Z-height, capture the image, and unload that image while simultaneously translating the equipment to the next image.

These various classifications, such as "interesting for focus points," may be helpful for determining what magnification to use during the subsequent imaging of the SCAN or COLLECT phase of operation. More specifically, during the FIND phase of operation, a lens power may be used that is suitable for looking at the general geometry and morphology of sample 716. However, in the COLLECT phase of operation, some information has already been acquired regarding which portions of scan region 712 are interesting and which portions may include diagnostically important items. Therefore, a high-magnification lens in combination with camera 518 may be used to capture an image of all "interesting" scan-zelles 1110. Subsequently, the image data generated during the COLLECT phase of operation may be transmitted to controller 512, and may be compressed and stored for subsequent image reconstruction and inspection by a clinician.

Having established both the pattern of "interesting" scan-zelles 1110 and the focus plane, system 500 can now lay out a series of locations where high-resolution images will be taken during the COLLECT phase of operation. This can be done in various ways. In a first exemplary technique, the size and shape of scan-zelles 1110 may be set to match the FOV of a high-resolution lens. For example, if the FOV is square and the initial image was a 1.times. lens, a 4.times. lens in which the 4.times. FOVs can be designed to fit in the 1.times. FOV may be used. The resulting scan-zelles 1110 are therefore one-fourth the size of the 1.times. FOV.

In another exemplary technique, the size and shape of scan-zelles 1110 may not match the FOV of the high-resolution lens. One way of handling this situation is that the pattern of high-power FOVs that are to be collected (i.e., "SCAN" FOVs) is predetermined, i.e., the pattern is a tiling of the slide, possibly with overlap (where the percentage of overlap may be a parameter of the program based upon the mechanical stage positional inaccuracy). The pattern of "interesting" scan-zelles 1110 may then be projected upon this predetermined pattern of high-power FOVs, using algorithms knowing the dimensions and boundaries of both.

The high-power FOVs needed to capture all the "interesting" scan-zelles 1110 are thus established and tabulated. In other words, any high-power FOV intersecting an "interesting" scan-zelles 1110 is flagged as needed. Non-intersecting high-power FOVs are flagged as not needed. Thus, a list is generated of the high-power FOVs of which images are to be taken to capture all "interesting" scan-zelles 1110. It is possible that only a small portion of these high-power FOVs actually include "interesting" scan-zelles 1110, but such coverage may be necessary so that no item of interest is missed. This method of predetermining the layout of any magnification FOV is used with attributes or combinations of attributes. Example attributes include content for focus but not content for scan, content for scan but not content for focus, content for wanting to revisit for higher power, and the like.

Another way of handling the situation is as follows. Having determined the pattern of "interesting" scan-zelles 1110 or even knowing one of more broad regions that are "interesting," everything in that known region may be captured at a higher power. An algorithm can be run to determine the minimum number of high-power FOVs necessary to cover a known region of "interesting" scan-zelles 1110. Additionally, a first high-power FOV may be aligned to a corner of a first "interesting" scan-zelle 1110; the pattern of high-power FOVs is then continued until the entire region of "interesting" scan-zelles 1110 is covered. The period of high-power FOVs will differ from the period of "interesting" scan-zelles 1110. In general, high-power FOVs can be further subdivided into scan-zelles 1110. The high-power FOVs may be stitched together to reconstruct the picture. This process can be repeated any number of times for any number of levels of magnification.

Alternatively, when the "interesting" items are sparse (spread out), the chance of having two adjacent "interesting" scan-zelles 1110 is low, especially as the magnification increases, i.e., the object is smaller than the FOV. In this case, instead of working in scan-zelles 1110, an "interesting" item is simply located and a high-power FOV is centered upon them, capturing them. In this case, the location of just the "interesting" items to be located is stored within controller 512.

Image data compression associated with the SCAN or COLLECT phase of operation may be achieved using block compression algorithms that are applicable to pixel-level compression on the high-resolution images. Many data compression techniques may be used. An exemplary technique includes the following. Each high-power FOV is compressed in two ways: a first pass using a modification of the well-known Classic Huffman Shift compression algorithm (see, for example, I.R.E. September 1952, page 1098, "A Method for the Construction of Minimum-Redundancy Codes" by David A. Huffman, which is herein incorporated by reference) and a second pass using a White Clip compression algorithm.

The compression algorithms are more efficient in this application because some information has been obtained about the data, i.e., information has been obtained about what is and is not important, and thus parameters may be set accordingly. This knowledge thus allows the compression to be modified for efficiency. For example, the Classic Huffman compression algorithm may take advantage of the understanding of the distribution of the colors in the image. Filters may be defined as to what colors are of higher value and which are of less or no value. For example, the non-valuable colors may be set to the same value (and thus require minimal storage space) without compromising picture quality when restored. Whatever color variations exist in the white space, for example, are non-informational; thus, restoring this space as uniformly white is acceptable. [0081] In summary, microscope imaging system 500 may perform a silhouette scan operation for improved image data storage requirements and data acquisition time. The imaging system and method described above may allow for an image capture of scan region 712 and a first level of data compression at a low-resolution stage. Scan zelles 1110 may be sorted into "non-interesting" vs. "interesting," and data associated with the "non-interesting" scan-zelles 1110 may be discarded.

Subsequently, a second level of data compression at the high-resolution stage may be performed, wherein the "non-interesting" space may be set to the same value, while everything of importance is stored losslessly. Systems and techniques of the current disclosure may provide a substantial benefit in that they may be performed autonomously. That is, once the process is initiated (e.g., when one or more slides are provided to microscope subsystem 510), the process may execute without human intervention or decision-making.

An illustration follows of the general operation of microscope imaging system 500 analyzing, for example, sample 716 of a lymph node. The lymph node tissue may be stained with a dye that makes a suspected cancer cell turn brown, while the rest of the tissue may be stained with a common blue dye that is used to mark tissue. One or more parameters of the test are set accordingly. For example, a parameter may be set to indicate that an area that is blue or brown is "interesting." Further, another parameter may be set to indicate that an area that is brown is "very interesting."

A FIND phase of operation occurs upon microscope slide 700 where a low-resolution image (i.e., FIND silhouette 1000) of the entire lymph node is captured. Based upon the predetermined parameters, image-processing algorithms and image analysis algorithms are executed by controller 512. Anything that is found to be blue or brown is classified as "interesting," but brown is further classified as "very interesting."

In a FOCUS phase of operation, a number of focus points and their locations may be determined. A focus plane may be derived from the focus points. In a SCAN phase of operation, a more precise higher-resolution image is generated (i.e., SCAN silhouette 1100) for processing. Optionally, the FOCUS and SCAN phases may be repeated any number of times at progressively higher resolutions to identify "interesting" regions.

A COLLECT phase of operation is performed, which may use focus cues from the previous phase. Another image scan is done on the "very interesting" scan-zelles 1110 with a high-power lens. This example illustrates that varying degrees of "interestingness" may be defined. As a result of the FIND phase, the FOCUS phase, the SCAN phase, and the COLLECT phase, a set of tables are generated that have effectively compressed scan-zelles 1110 to pixels, each having one or more classifications as, for example, non-interesting, interesting, very interesting, interesting for focus points, interesting for higher power, and the like. The image data generated during the SCAN or COLLECT phases of operation may be transmitted to controller 512. Data compression algorithms may be executed on the image data, thereby completing a second level of image data compression. Having completed these two levels of data compression, the image data is stored in memory of controller 512 (or other memory). The image data may subsequently be accessed for future image reconstruction and inspection by a clinician.

Figure 12:
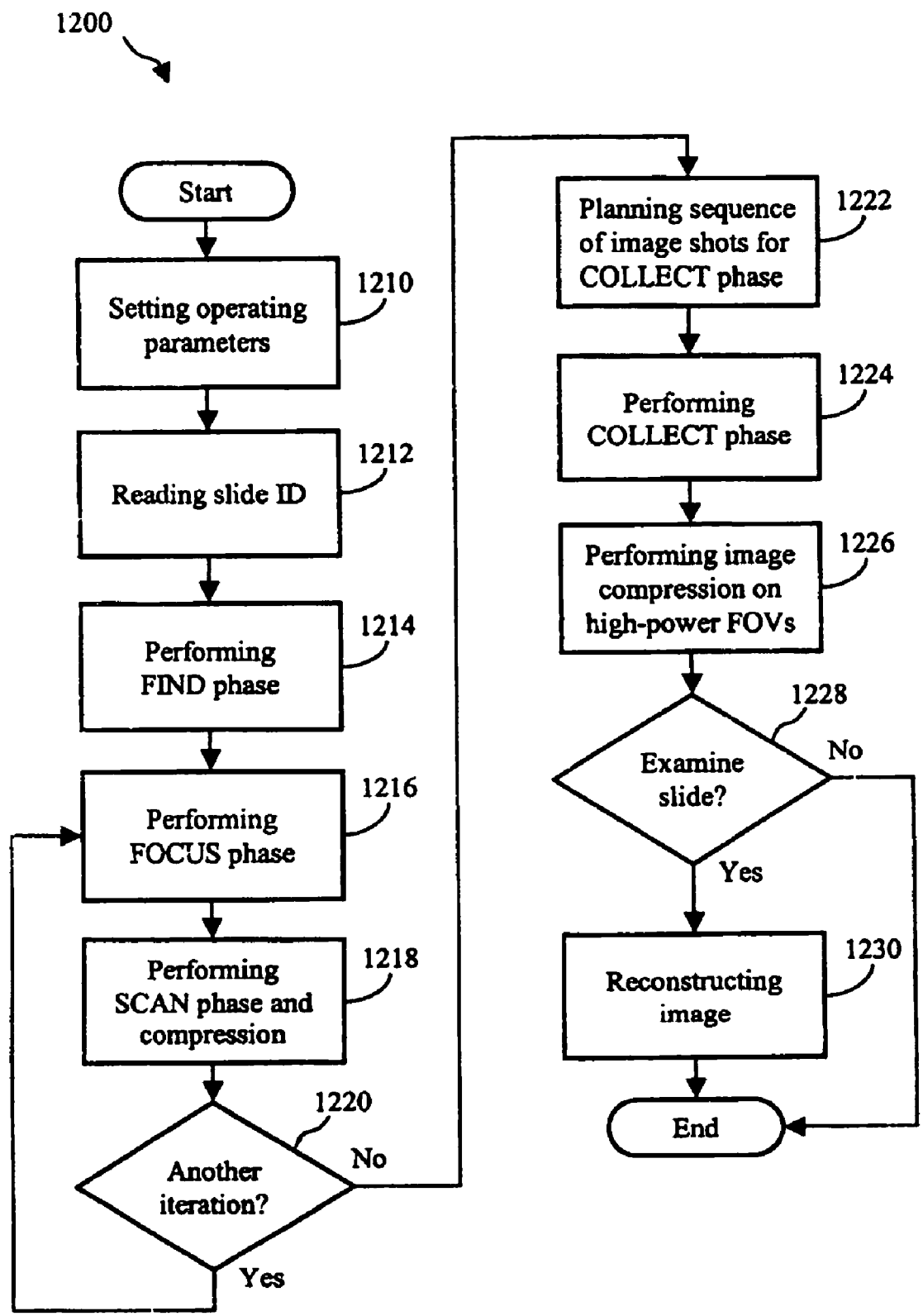
FIG. 12 illustrates a method of performing a silhouette scan operation.

FIG. 12 illustrates a method 1200 of performing a silhouette scan operation for improved image data acquisition time and image data storage. In order to perform a specific test of one or more samples 716 on one or more slides 700, one or more suitable parameters are determined or provided. The parameters may be used to analyze appropriate zelles 810 and minor-zelles 910 and to determine whether they include anything designated as interesting (1210). Many parameters are possible. For example, parameters may include specimen color, size, features, or distribution and sensitivity for the specific test being run.

A target slide may be provided to system 500, and an ID of a target microscope slide 700 may be read by barcode reader 516 so that any image data saved may be linked to the appropriate microscope slide 700 (1212).

Scan region 712 of target microscope slide 700 is scanned via microscope subsystem 510 in combination with camera 518 (1214). Scan region 712 is partitioned into an array of contiguous zelles 810 covering the entire area of scan region 712. The area of each zelle 810 may be defined by the power (i.e., magnification) setting of the microscope (for example, the area of each zelle 810 may correspond to the area of the FOV of the setting of the microscope). Thus, the initial scan of scan region 712 may be performed efficiently. Zelles 810 may overlap slightly or abut. Overlap may be useful to ensure that no region is missed due to mechanical inaccuracies in the X-Y stage of microscope subsystem 510.

Since a low-power lens has a greater depth of focus than a high-power lens, microscope subsystem 510 may be able to search for tissue during the initial scan of scan region 712 without refocusing. For example, a low-power lens of the microscope may be focused at a best-guess plane or one derived from microscope calibration. Optionally, a separate low-resolution, wide-FOV camera may be used.

Images obtained during a scan of scan region 712 may be processed using image-processing algorithms and/or image analysis algorithms to determine any regions of microscope slide 700 having content worthwhile to reexamine at a higher magnification during a subsequent FOCUS, SCAN or COLLECT phase of operation. In some implementations, any zelle 810 or minor-zelle 910 found to have specimen content is classified as "interesting" and mapped as a logical "1." By contrast, any zelle 810 or minor-zelle 910 found to have no specimen content is classified as "non-interesting" and mapped as a logical "0." In this manner, a silhouette of the specimen, i.e., sample 716, is formed, thereby creating what is effectively a low-resolution image that may be processed. An image table is generated that represents the low-resolution image of sample 716.

Prior to a higher resolution operation, the number and/or placement of focus points may be selected (1216), as described above. A focus plane may be determined from the focus points. A SCAN operation may be performed, and image data may be compressed (1218). Given that statistically, based upon the entire area of a particular zelle 810 or minor-zelle 910, there might be very little material of interest, each zelle 810 or minor-zelle 910 may be subdivided into yet smaller regions using data processing. Each zelle 810 or minor-zelle 910 may therefore be further partitioned, forming a SCAN silhouette 600 formed of the plurality of scan-zelles 1110, as shown in FIG. 11.

Like zelles 810 or minor-zelles 910, the "interestingness" of these scan-zelles 1110 is assessed via image-processing algorithms and image analysis algorithms. This is done in preparation for a future operation of collecting and saving a series of higher magnification FOVs (i.e., in the COLLECT phase), as only the "interesting" regions are generally examined at a higher magnification.

In some implementations, scan-zelles 1110 may be defined to match the anticipated FOVs of the higher power images of the COLLECT phase of operation. The size of scan-zelles 1110 and whether scan-zelles 1110 match up with the anticipated FOVs of the higher power images are adjustable system parameters that may be set (1210). Using image-processing algorithms and image analysis algorithms that may be executed by controller 512 (or other data processor), scan-zelles 1110 found to have specimen content are classified as "interesting" and mapped as a logical "1." By contrast, scan-zelles 1110 found to have no specimen content are classified as "non-interesting" and mapped as a logical "0." In this manner, further image compression occurs and a yet more precise silhouette of sample 716 is formed, thereby creating a slightly higher-resolution image, than that generated in the FIND phase. This higher resolution image may be processed using image-processing algorithms.

The system may determine whether another iteration is performed (1220). The decision may be based on one or more parameters, such as the type of test, expected size of feature, etc. If iteration is desired, the above actions may be repeated (1216 et seq.) If iteration is not desired, a sequence of image shots for a COLLECT phase may be planned (1222). Various sequences of operations may occur to modify the "interesting" regions as determined by the requirements of a particular test. The result is a table of "interesting" and "non-interesting" scan-zelles 1110 as modified via the specific requirements.

The COLLECT phase may then be performed (1224). Having established both the pattern of "interesting" scan-zelles 1110 and the focus plane, system 500 now lays out a series of locations where high-resolution images are taken during this COLLECT phase of operation. As a result, with specific knowledge of interesting regions and of diagnostically important items, a high-magnification lens in combination with camera 518 are used to capture an image of all "interesting" scan-zelles 1110. Image data generated during the COLLECT phase of operation may be transmitted to controller 512.

Image data acquired in the SCAN and/or COLLECT phase may be compressed (1226), as described above. A determination may be made as to whether the particular slide 700 with sample 716 is to be examined and analyzed (1228). If it is, a clinician may recall the image data for the selected microscope slide 700 and controller 512 (or other data processor) may subsequently reconstruct the image by stitching together individual scan-zelles 1110, and/or high-power FOVs. The image may then be displayed to the clinician for inspection via display device 514.

The various techniques, methods, and aspects of the invention described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those of the invention described elsewhere in this document. Various computer-based systems, methods and implementations in accordance with the above-described technology are presented below.

A processor-based system can include a main memory, preferably random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage medium. Removable storage medium refers to a floppy disk, magnetic tape, optical disk, and the like, which is read by and written to by a removable storage drive. As will be appreciated, the removable storage medium can comprise computer software and/or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a movable memory chip (such as an EPROM or PROM) and associated socket, and other removable storage units and interfaces, which allow software and data to be transferred from the removable storage unit to the computer system.

The computer system can also include a communications interface. Communications interfaces allow software and data to be transferred between computer system and external devices. Examples of communications interfaces can include a modem, a network interface (such as, for example, an Ethernet card), a communications port, a PCMCIA slot and card, and the like. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other communications channels.

In this document, the terms "computer program medium" and "computer usable medium" are used to refer generally to media such as a removable storage device, a disk capable of installation in a disk drive, and signals on a channel. These computer program products are means for providing software or program instructions to a computer system.

Computer programs (also called computer control logic) are stored in main memory and/or secondary memory. Computer programs can also be received via a communications interface. Such computer programs, when executed, enable the computer system to perform the features of the invention as discussed herein. In particular, the computer programs, when executed, enable the processor to perform the features of the invention. Accordingly, such computer programs represent controllers of the computer system.

In an embodiment where the elements are implemented using software, the software may be stored in, or transmitted via, a computer program product and loaded into a computer system using a removable storage drive, hard drive or communications interface. The control logic (software), when executed by the processor, causes the processor to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to person skilled in the relevant art(s). In yet another embodiment, elements are implanted using a combination of both hardware and software.

In another embodiment, the computer-based methods can be accessed or implemented over the World Wide Web by providing access via a Web Page to the methods of the invention. Accordingly, the Web Page is identified by a Universal Resource Locator (URL). The URL denotes both the server machine and the particular file or page on that machine. In this embodiment, it is envisioned that a consumer or client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol ("HTTP")). The selected page is then displayed to the user on the client's display screen. The client may then cause the server containing a computer program of the invention to launch an application to, for example, perform an analysis according to the invention.

Although only a few implementations have been described in detail above, other modifications are possible. For example, different types of image acquisition, processing, and analysis systems may be used. The logic flows depicted in FIGS. 2-4 and 12 do not require the particular order shown, or sequential order, to achieve desirable results. For example, reading a slide identifier may be performed at many different places within the overall process. In certain implementations, multitasking and parallel processing may be preferable.

Other embodiments may be within the scope of the following claims.

The invention claimed is:

1. A computer implemented method, comprising:
obtaining a digital image of at least a portion of a scan region containing a sample using a digital image capture device operably coupled to an optical microscope, the sample having a perimeter and occupying a sample region that is smaller than the scan region;
electronically dividing the digital image of the scanned region into segments;
analyzing the digital image with a computer implemented algorithm to determine the presence or absence of segments containing a first desired feature of the sample;
analyzing each segment for the presence of the first desired feature and identifying each segment that contains the first desired feature including segments that intersect the perimeter of the sample and contain the first desired feature as well as non-sample portions;
logically separating the segments identified as containing the first desired feature from the segments that do not contain the first desired feature; and
electronically dividing only those segments of the image identified as containing the first desired feature into a plurality of substantially contiguous subimage segments at the same magnification, the substantially contiguous subimage segments together defining a contiguous area that corresponds to the sample region;
determining the presence or absence of a second desired feature in each subimage segment; and
logically separating the subimage segments identified as containing the second desired feature from the subimage segments that do not contain the second desired feature.

2. The method of claim 1, wherein the first desired feature and the second desired feature are the same.

3. The method of claim 1, wherein the digital image is acquired at a first magnification as which the optical microscope has a field of view smaller than the scan region.

4. The method of claim 1, wherein the plurality of subimage segments each comprises an area that is substantially equal to the field of view of a higher magnification.

5. The method of claim 1, further comprising obtaining a plurality of digital images of the scan region.

6. The method of claim 5, wherein the plurality of digital images are obtained using a first magnification of the microscope.

7. The method of claim 1, further comprising acquiring an image of an area of the scan region including the second desired feature at a higher magnification.

8. A system, comprising:
an image acquisition system that obtains a digital image of a scan region containing a sample having a perimeter and occupying a sample region and that outputs image data;
a data processor communicatively coupled with the image acquisition system and programmed with an algorithm to determine the presence or absence of segments containing a first desired feature of the sample, the data processor receiving the image data and electronically dividing the scanned region into the segments; to analyze each of the segments for the presence of the first desired feature and to identify each of the segments that contains the first desired feature including the segments that intersect the perimeter of the sample and contain the first desired feature as well as non-sample portions; to logically separate the segments identified as containing the first desired feature from the segments that do not contain the first desired feature; and to electronically divide only those segments of the image identified as containing the first desired feature into a plurality of substantially contiguous subimage segments at the same magnification, the substantially contiguous subimage segments together defining a contiguous area that corresponds to the sample region; to determine the presence or absence of a second desired feature in each subimage segment; and to logically separate the subimage segments identified as containing the second desired feature from the subimage segments that do not contain the second desired feature.

9. The system of claim 8, further comprising a display operably coupled to the image acquisition system.

10. An article comprising a non-transitory computer-readable medium storing instructions operable to cause one or more machines to perform operations comprising:

obtaining a digital image of at least a portion of a scan region containing a sample using a digital image capture device operably coupled to an optical microscope, the sample having a perimeter and occupying a sample region that is smaller than the scan region;

electronically dividing the digital image of the scanned region into segments;

analyzing the digital image with a computer implemented algorithm to determine the presence or absence of the segments containing a first desired feature of the sample;

analyzing each of the segments for the presence of the first desired feature and identifying each of the segments that contains the first desired feature including the segments that intersect the perimeter of the sample and contain the first desired feature as well as non-sample portions;

logically separating the segments identified as containing the first desired feature from the segments that do not contain the first desired feature; and electronically dividing only those segments of the image identified as containing the first desired feature into a plurality of substantially contiguous subimage segments at the same magnification, the substantially contiguous subimage segments together defining a contiguous area that corresponds to the sample region;

determining the presence or absence of a second desired feature in each subimage segment; and logically separating the subimage segments identified as containing the second desired feature from the subimage segments that do not contain the second desired feature.

11. The article of claim 10, further comprising instructions operable to cause one or more machines to perform operations wherein the presence of the first desired feature is indicated by associating the subimage segment containing the first desired feature with a logical 1.

12. The article of claim 10, further comprising instructions operable to cause one or more machines to perform operations indicating the absence of the first desired feature by associating the subimage segment not containing the first desired feature with a logical 0.

* * * * *